(12) United States Patent
Guerena et al.

(10) Patent No.: US 11,758,411 B2
(45) Date of Patent: Sep. 12, 2023

(54) BEAM ALIGNMENT AND BEAM TRACKING IN VEHICLE-TO-VEHICLE COMMUNICATIONS

(71) Applicant: Nant Holdings IP, LLC, Culver City, CA (US)

(72) Inventors: Thomas Guerena, Rancho Santa Margarita, CA (US); John Wiacek, Los Angeles, CA (US); Nicholas J. Witchey, Laguna Hills, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 257 days.

(21) Appl. No.: 17/155,051

(22) Filed: Jan. 21, 2021

(65) Prior Publication Data

US 2021/0235285 A1    Jul. 29, 2021

Related U.S. Application Data

(60) Provisional application No. 62/965,012, filed on Jan. 23, 2020.

(51) Int. Cl.
*H04W 16/28* (2009.01)
*H04W 4/46* (2018.01)

(52) U.S. Cl.
CPC ............ *H04W 16/28* (2013.01); *H04W 4/46* (2018.02)

(58) Field of Classification Search
CPC ........ H04W 4/029; H04W 4/02; H04W 16/28
See application file for complete search history.

(56) References Cited

U.S. PATENT DOCUMENTS 7,898,472 B2    3/2011  Zeng
9,948,339 B1    4/2018  Buchbut et al.
(Continued)

FOREIGN PATENT DOCUMENTS

WO   WO-2018182706 A1 * 10/2018  ........... B60R 16/023
WO   WO-2021133408 A1 *  7/2021  ........... B60Q 1/0017

OTHER PUBLICATIONS

Choi, J. et al., "Millimeter Wave Vehicular Communications to Support Massive Automotive Sensing" p. 1-7 (2016).
(Continued)

*Primary Examiner* — Khalid W Shaheed
(74) *Attorney, Agent, or Firm* — HARNESS, DICKEY & PIERCE, PLC

(57) ABSTRACT

In some aspects, there is provided a method. The method may include selecting a first antenna coupled to a first transceiver at a first vehicle; determining a configuration of a first beam pattern emanated by the first antenna; and reconfiguring, based on the configuration of the first beam pattern and a beam tracking packet, the first antenna to provide a beam tracking of the first beam pattern. The first beam pattern may be associated with a wireless communication link to an object proximate to the first vehicle, which may be a second vehicle or a stationary object. Reconfiguring the first antenna may be further based on a steering angle associated with the first antenna and a distance between the first vehicle and the object proximate to the first vehicle. A rate of reconfiguring the first antenna may be based on a location of the first antenna, the configuration of the first beam pattern, a velocity of the first vehicle relative to the object proximate to the first vehicle, and an orientation of the first antenna. Related apparatuses and non-transitory computer-readable storage media are also disclosed.

20 Claims, 19 Drawing Sheets

(56) References Cited

U.S. PATENT DOCUMENTS

| | | |
|---|---|---|
| 9,959,763 B2 | 5/2018 | Miller et al. |
| 10,050,690 B1 | 8/2018 | Buchbut et al. |
| 2019/0074873 A1* | 3/2019 | Liu ................... H04B 7/0695 |
| 2020/0212988 A1* | 7/2020 | Lim ................... H04B 7/0617 |

OTHER PUBLICATIONS

Muns, G.R. et al., "Beam Alignment and Tracking for Autonomous Vehicular Communication using IEEE 802.11ad-based Radar" p. 1-9 (2017).

\* cited by examiner

1100

1400

1450

BEAM ALIGNMENT AND BEAM TRACKING IN VEHICLE-TO-VEHICLE COMMUNICATIONS

CROSS-REFERENCE TO RELATED APPLICATION

This application claims the benefit of U.S. Provisional Patent Application No. 62/965,012, filed Jan. 23, 2020, which is incorporated by reference herein in its entirety.

TECHNICAL FIELD

The subject matter described herein relates generally to wireless communications and, more specifically, to beam tracking in a communication link.

BACKGROUND

A wireless device may utilize beamforming to discover and establish communication links with other wireless devices. The wireless device may be stationary and/or in motion. For example, a vehicle in motion may include a wireless device that establishes a vehicle-to-vehicle (V2V) communication link with another wireless device at another vehicle. The vehicle may also establish a vehicle-to-everything (V2X) communication link with another object such as a stationary roadside wireless unit/node.

SUMMARY

In some aspects, there is provided a method. The method may include selecting a first antenna coupled to a first transceiver at a first vehicle; determining a configuration of a first beam pattern emanated by the first antenna; and reconfiguring, based on the configuration of the first beam pattern and a beam tracking packet, the first antenna to provide a beam tracking of the first beam pattern. The first beam pattern may be associated with a wireless communication link to an object proximate to the first vehicle, which may be a second vehicle or a stationary object. Reconfiguring the first antenna may be further based on a steering angle associated with the first antenna and a distance between the first vehicle and the object proximate to the first vehicle. A rate of reconfiguring the first antenna may be based on a location of the first antenna, the configuration of the first beam pattern, a velocity of the first vehicle relative to the object proximate to the first vehicle, and an orientation of the first antenna.

In some variations, one or more of the features disclosed herein including the following features can optionally be included in any feasible combination. The beam tracking packet may be received via the wireless communication link. Reconfiguring the first antenna may include a modification of the first beam pattern. The modification of the first beam pattern may include a modification of a beamwidth of the first beam pattern and/or a modification of a range of the first beam pattern. Reconfiguring the first antenna may include determining, based on a field of operation of the first antenna, an amplitude and a phase for reconfiguring the first antenna; and applying the amplitude and the phase to the first antenna. The determining the configuration of the first beam pattern may be based on configuration information associated with the first antenna. The determining the configuration of the first beam pattern may be based on configuration information associated with a second antenna proximate to the first antenna. The reconfiguring may be further based on link metrics of the wireless communication link. The first vehicle may be an emergency vehicle, and the method may further include selecting a second antenna coupled to a second transceiver at the first vehicle, determining a second beam pattern emanated by the second antenna, and broadcasting, via the second beam pattern emanated by the second antenna, a message indicating the first vehicle requires a right of way through traffic. The first vehicle may include a plurality of antennas including the first antenna. The plurality of antennas may each be coupled to a respective transceiver of a plurality of transceivers at the first vehicle.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to beam alignment and tracking, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
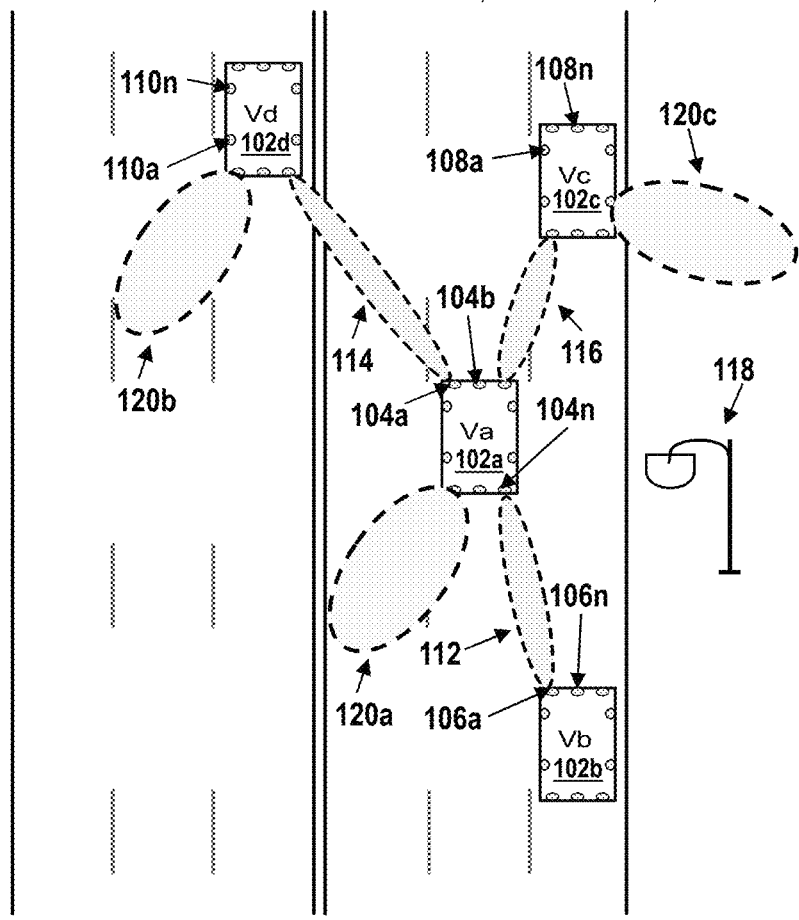
FIG. 1 depicts a diagram of antenna beam patterns, in accordance with some example embodiments.

Advancements in wireless technologies implemented in the vehicles enable V2V, V2X, or vehicle-to-infrastructure (V2I) wireless communications. With demand for advanced vehicle functionalities such as assisted or autonomous driving, many vehicles are equipped with a multitude of sensors such as a camera, a radar, a light detection and ranging (LIDAR) unit, a global navigation satellite system (GNSS)/global positioning system (GPS) receiver, and the like that are configured to collect, utilize, and share information with other vehicles or objects. The sharing of potentially large amounts of data may require a quick discovery of nearby wireless devices and may require establishing and maintaining one or more communication links, which operate at high data rates, to those nearby wireless devices. However, due to changes in the environment, such as movements by the vehicle including a wireless device, the discovery and maintenance of a communication link requires frequent updates. Therefore, there is a need to provide efficient, rapid beam alignment, steering, and/or tracking in V2V or V2X communications.

Multiple millimeter-wave radios, each coupled to a multi-element antenna array, may be arranged about a mobile vehicle (e.g., an automobile, a truck, an airplane, a motorcycle, a drone, an unmanned aerial vehicle, an emergency vehicle, or a satellite.) Each radio may use its location (e.g., from a location behavioral profile), relative velocity (e.g., a projection either parallel or perpendicular to a direction of travel), and distance information to reduce the beam steering (or beam tracking) overhead associated with maintaining a link, wherein the link may be formed via narrow millimeter-wave beams. Examples of beam tracking overhead are given with respect to the Institute for Electrical and Electronics Engineers (IEEE) 802.11ad (IEEE 802.11-2012, IEEE 802.11-2016 media access control layer (MAC) and physical layer (PHY) standard) Beam Refinement Protocol (BRP). Each of the multiple radios may include the electronics required for host interface, MAC, PHY (digital modem, mixed-signal analog, and millimeter-wave radio frequency (RF) electronics), and antenna array interface (e.g., power amplifiers, low noise amplifiers). An advantage of millimeter-wave for this application includes a small form factor for the antenna arrays. Small form factor antenna arrays coupled to radios with low cost, low power, and highly integrated circuits (ICs) is advantageous for V2V or V2I communication systems requiring multiple radio/antenna arrays.

Antennas in wireless communications may be broadly classified as omnidirectional and directional. An omnidirectional antenna generates a 360 degree radiation pattern that provides coverage in all horizontal directions from the antenna. Although a vehicle may be equipped with multiple transceivers including omnidirectional antennas, interference caused by multiple radiation patterns generated by the omnidirectional antennas may degrade the range and throughput capacity of any communication links established by such antennas. In contrast, a directional antenna focuses its RF energy in a particular direction. Therefore, to improve the efficiency of V2V or V2X communications, a vehicle may be equipped with a plurality of transceivers including steerable directional antennas. The directional antenna beam of each transceiver can provide a communication link with a maximized range and data throughput.

FIG. 1 depicts a diagram 100 of antenna beam patterns 112-116, in accordance with some example embodiments. FIG. 1 depicts vehicles Va 102a, Vb 102b, Vc 102c, and Vd 102d. Each of the vehicles may include one or more transceivers that may be coupled with or include one or more antennas. An antenna may be an antenna array including one or more antenna elements. Each small circle in FIG. 1 (e.g., 104a at vehicle 102a, 106a at vehicle 102b) represents the location of a radio transceiver and its antenna array. However, to facilitate the discussions below, a radio transceiver and its antenna array may be referred to by the location reference. For example, an antenna and/or a radio at location 104a may be referred to as antenna 104a and/or radio 104a; an antenna and/or a radio at location 106a may be referred to as antenna 106a and/or radio 106a.

In the example of FIG. 1, an antenna beam pattern, such as antenna beam patterns 112, 114, and 116, is transmitted from a vehicle to another vehicle. These antenna beams may be directional in the sense that each beam may have a relatively narrow beamwidth when compared to an omnidirectional antenna's beam. Moreover, each of the antenna beams 112-116 may be considered a peer-to-peer beam in the sense that a given antenna beam may couple two peers which, in this example, are two vehicles. An antenna beam at a vehicle may be established on an ad hoc basis as needed for V2V communication or for V2I communication with a roadside unit 118 (e.g., a remote sensor or camera including a radio and antenna for relaying traffic information to an Internet server).

In some examples, the V2V or V2I system may be implemented at other types of objects, such as unmanned vehicles, drones, delivery vehicles, robots, toys, appliances, movie cameras, material handling equipment (e.g., forklifts, swing lifts, side loaders, cranes, and/or the like), packages, shipping containers and/or the like. The systems implemented at such objects may establish one or more communication links with nearby objects. Example embodiments may include V2V and V2I communication between two or more moving objects (e.g., vehicles.) Alternatively and/or additionally, example embodiments may include V2V and V2I communication between one or more moving objects (e.g., vehicles) and one or more stationary objects (e.g., a street light, a building, a sign, a smart sign, or a roadside unit.)

In the example of FIG. 1, each of the vehicles 102a, 102b, 102c, and 102d may include a plurality of transceivers. For example, a transceiver at a given vehicle may establish communications via a directional antenna beam with another object. To illustrate further, a transceiver at vehicle 102a may establish a wireless communication link, including a directional antenna beam 112, with vehicle 102b. Likewise, a transceiver at vehicle 102a may establish a communication link, including a directional antenna beam 114, with vehicle 102d. A transceiver at vehicle 102a may also establish a communication link, including a directional antenna beam 116, with vehicle 102c. In the example of FIG. 1, the transceivers at the vehicles 102b, 102c, and 102d may initiate and establish communication links forming directional antenna beams with one or more other vehicles or roadside units as well.

Moreover, the directional antenna beam patterns 112, 114, and 116 may be ad hoc links that are dynamically established when needed for communication and disconnected when no longer needed for V2V and/or V2I communications with another object, such as a vehicle or a roadside unit (e.g., a smart sign, a building, a street light, and/or the like.) Directional beams may reduce interference with other beams at the same or at other vehicles and possibly eliminate the necessity of over-the-air network coordination.

As noted, one or more transceivers at each vehicle may be configured to form directional beams. In some embodiments, each of the transceivers at each vehicle may be able to steer a beam towards another vehicle or a location on the other vehicle. For example, a transceiver at vehicle 102b may steer the directional beam 112 towards vehicle 102a by steering the antenna beam pattern that is generated by the antenna at location 106a. Furthermore, the transceivers at each vehicle may control their transmit power by regulating the amount of power each transceiver delivers to its corresponding antenna to reduce interference with other transceivers at the vehicle.

In some embodiments, the transceivers may be configured to operate in a millimeter-wave spectrum, and one or more corresponding antennas may operate at millimeter wavelengths. For example, the transceivers at one or more of the vehicles 102a-102d may be configured to provide V2V and V2I in a portion of the millimeter-wave portion of the spectrum (e.g., 30 gigahertz (GHz) to 300 GHz). In some embodiments, the transceivers may operate in the unlicensed 60 GHz millimeter wave band to provide a reduction in the size of the antenna and an increase in data throughput, when compared to a transceiver operating over lower frequencies. In the case of the 60 GHz band, this band may be for forming a mesh network as an alternative to a local network over WiFi, or for providing as high-speed support to dedicated short-range communications. The transceiver may implement a mesh network protocol that conforms to a mesh network standard, such as the IEEE 802.11s, ultra wideband (e.g., IEEE 802.15.3), LoWPAN (e.g., IEEE 802.15.4), Bluetooth, Bluetooth, Bluetooth Low Energy (BLE), and/or the like. In some embodiments, the transceivers may be configured to operate in other parts of the spectrum, such as a laser communications and/or infrared spectrum.

To perform efficient beam steering, a transceiver at the vehicle 102a may use information about the location and orientation of the antenna 104a, relative velocity of the vehicle 102a with respect to a peer vehicle such as 102d, distance from the vehicle 102a to the peer vehicle such as 102d, and link metrics to determine a beamwidth and/or a direction of the beam towards the peer vehicle (e.g., beam 114 has a direction, such as an angle, from vehicle 102a to vehicle 102d). This information may be obtained from sensors such as a radar, a GNSS/GPS receiver, an odometer, a light detection and ranging (LIDAR) unit, an inertial measurement unit (IMU), a camera, radar functions over the communication link, or a variety of other sensors. The information may also be retrieved from the peer vehicle over the communication link. As used herein, velocity may include a two-dimensional vector and magnitude indicating a direction and speed of the vehicle 102a-102d. Alternatively and/or additionally, velocity may include a three-dimensional vector and magnitude indicating a direction and speed of the vehicle 102a-102d.

A transceiver at a given vehicle, based on the noted information, may determine when to initiate a handoff of an established link to a neighboring transceiver at the same vehicle. For example, the transceiver associated with the antenna 104a at the vehicle 102a may determine to handoff a link, already established by the antenna beam pattern 114, to the transceiver associated with the antenna 104b at the vehicle 102a.

Figure 2A:
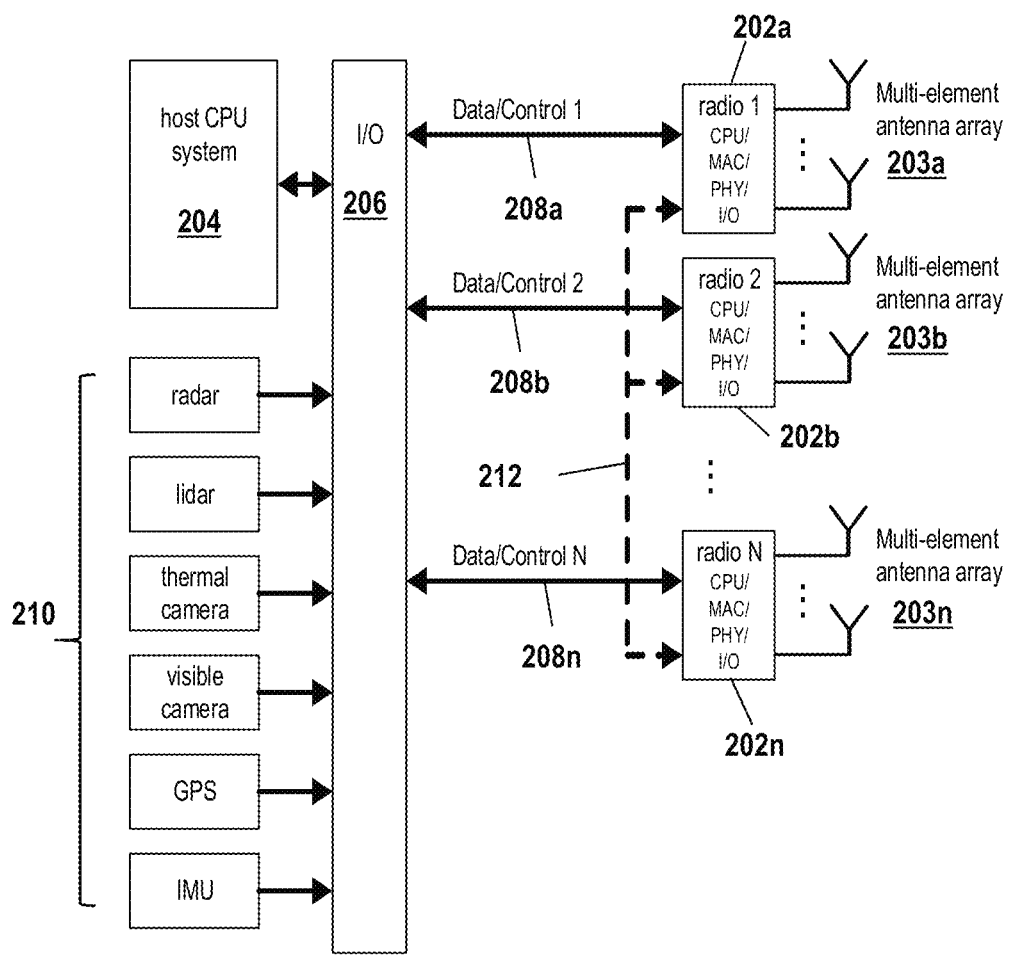
FIG. 2A depicts a diagram of an example of a vehicular sensor system, in accordance with some example embodiments.

FIG. 2A depicts a diagram of an example of a vehicular sensor system 200, in accordance with some example embodiments. The system 200 may include one or more transceivers 202a-202n, each of which may be coupled to a corresponding antenna 203a-203n. Although the system 200, of FIG. 2A, includes multi-element antennas at 203a-203n as an example, the antennas 203a-203n may also include an antenna with a single element. For example, the antennas 203a-203n may be implemented as a single element array that forms a single, fixed antenna beam. Alternatively, the antennas 203a-203n may be implemented as a multi-element array that can be configured to form multiple, narrow or wide antenna beams. Each of the transceivers 202a-202n may include a local central processing unit (CPU) and associated circuitry, such as circuitry for the media access control layer, the modem/radio physical layer (digital baseband, analog, and RF circuits), a host interface, and an interface circuitry to the antenna. Each of the transceivers 202a-202n may have a carrier center frequency of at least 23 GHz (although other frequencies including millimeter wave frequencies may be used as well). And, each of the transceivers 202a-202n may be configured to have a physical layer data rate of at least 1 gigabits per second (Gbps), although other data rates may be realized as well.

The multi-element antennas (e.g., antenna arrays) 203a-203n may be physically and electrically configured to produce narrow or broad beam patterns. In one example, some of the antennas 203a-203n (e.g., antennas on the sides of a vehicle) may be configured to produce broader beam patterns than those antennas located in the front or rear of the vehicle. In some example embodiments, an antenna 203a-203n having a fewer number of elements (e.g., eight (8) elements, four elements, etc.) may produce a broader beam pattern compared to an antenna 203a-203n having a greater number of elements (e.g., 64 elements, 128 elements, etc.). Moreover, the beam pattern produced by the antenna 203a-203n having eight elements may have a smaller gain and a shorter communication distance when compared to the beam pattern produced by the antenna 203a-203n with a greater number of elements. In some examples, a signal applied to one or more blocks of an antenna array 203a-203n may be disabled in order to render an antenna array 203a-203n with fewer active antenna elements.

The system 200 may also include a host CPU system 204 ("host CPU 204") in communication with the transceivers 202a-202n via an input/out (I/O) interface 206. The I/O interface 206 may be communicatively coupled via data and/or control lines, such as data and control lines 208a-208n. Data and/or control signals may be transferred via a parallel I/O bus protocol such as a bus that conforms to the peripheral component interconnect (PCI) standard and/or the advanced microcontroller bus architecture (AMBA) standard. Alternatively and/or additionally, the data and/or control signals may be transferred via a serial bus protocol such as a bus that conforms to the universal serial bus (USB) standard, IEEE 802.3 Ethernet standard, the peripheral component interconnect express (PCIe) standard, the inter-integrated circuit (I2C) standard, the serial peripheral interface (SPI) standard, the controller area network bus (CANbus) standard, and/or the like. The interface may be shared with other peripheral sensor units, such as a radar or a camera. The interface may be via a bridge, through a switched interface such as automotive Ethernet, and/or the like.

The host CPU 204 may coordinate the integration or the compiling of data received via one or more radio links such as 112, 114, and 116 in FIG. 1. The system 200 may simultaneously initiate, establish, or discontinue one or more radio links. The host CPU 204 or a transceiver 202a-202n at a vehicle may coordinate the operations among the transceivers 202a-202n at the vehicle. For example, the host CPU 204 and/or the transceiver 202a may share information about any neighboring transceivers that may have already established a link with another vehicle or object. The host CPU 204 may control the various radios 202a-202n based upon data or control information derived from a WiFi or cellular radio system such as dedicated short-range communications (DSRC) or cellular V2X (C-V2X) communications. The host CPU 204 may be part of a gateway performing network processing functions for the various sensor systems of a vehicle. The host CPU 204 may be multiple CPU's or GPU's performing gateway and/or sensor and/or radio assist functions. The I/O interface 206 may be a network switch, or a set of switches that may be used with automotive Ethernet networks, or other switched networks. The I/O interface 206 may also include a bridge to transport data/control to other host interfaces such as PCI, AMBA, USB, Ethernet, PCIe, I2C, SPI, CANbus, or other high-speed serial or parallel protocols.

The system 200 may also include a plurality of sensors 210, such as at least one radar, at least one LIDAR, at least one camera, at least one GNSS/GPS, at least one IMU, and/or other sensors. The sensors 210 may collect and share information with the host CPU 204 and/or with the transceivers 202a-202n via the I/O interface 206 and/or the data and control lines 208a-208n. Communications among the transceivers 202a-202n, the host CPU system 204, and/or the sensors 210 may include compressed, processed, and/or raw data transmitted via unicast, multicast, or broadcast messages.

The sensors' 210 information may be collected, maintained, and/or distributed by the host CPU 204 or a transceiver 202a-202n via the I/O interface 206, data and control lines 208a-208n, and/or other links 212. Operations of the transceivers 202a-202n may be coordinated based on information from the sensors 210. For example, the information may include GNSS/GPS location of a vehicle, acceleration of the vehicle, distance to other vehicles or communication nodes, sizes of the vehicles, status of the sensors at the vehicle, location of the transceivers and/or their antennas at the vehicle(s), and the distance from the transceivers and/or their antennas to the ground.

The information from the sensors 210 may be shared, via the transceivers 202a-202n, with other vehicles. For example, information from the sensor 210 may indicate obstacles and traffic conditions along one or more segments of a road. The system 200 may interact with roadside units, such as a remote camera including a radio and antenna for relaying traffic information to an Internet server, to identify obstacles or other obstructions, such as newly added structures. For example, a roadside unit may store and provide local static warnings (which may not change much over time) and/or dynamic warnings (which may change more frequently when compared to a static warning).

To illustrate further, a city worker might program an emergency indication that a pothole is present at one or more locations on a road. The emergency indication may be dynamic and last, for example, until city personnel arrive at the site to resolve the issue. The system 200 might also provide indications of temporary hazards, such as a police chase or other police emergency about which other vehicles may be warned. In one example, the system 200 may broadcast a message to other vehicles indicating that emergency vehicles are nearby and require right of way through the traffic. The message may be broadcast via a public address system in communication with the system 200 or by initiating an override via a mesh network including nearby vehicles and roadside units.

In another example, the sensors' 210 information may be useful to vehicles equipped with advanced driver assistance systems (ADAS). For example, a GNSS/GPS sensor may provide routing information to an autonomous or semi-autonomous vehicle for routing the vehicle to a desired destination. In yet another example, the global navigation satellite system may be utilized to synchronize the system 200, at a vehicle, with available roadside units. For example, to synchronize the global navigation satellite system's information about local roads from a roadside unit with a navigation system of a vehicle.

The plurality of transceivers 202a-202n at a vehicle (which may be arranged at appropriately spaced locations at the vehicle) may improve the data throughput of the system 200. Each of the transceivers 202a-202n may be designated to handle the communication links within a configurable region about the vehicle. For example, the transceiver 202a may be configured to establish a communication link via an antenna beam pattern generated at a certain area around the vehicle or within plus or minus an angle (e.g., plus or minus 30 degrees) relative to the position of the transceiver 202a. In some embodiments, a quantity of transceivers 202a-202n and each transceiver's location at the vehicle may be based on the vehicle's type (e.g., sedan, truck), size (e.g., length, width, and height), intended use (e.g., commercial, private), type of communications (e.g., V2V, V2X) and/or the like. System parameters such as communication link margins may also affect the quantity and location of the transceivers 202a-202n at a vehicle.

In some embodiments, a vehicle may be equipped with a quantity of transceivers 202a-202n that may be installed or placed at locations such that the system 200 may establish communication links with available peer vehicles and/or roadside units near the vehicle, for example, within a communication range at 360 degrees relative to the vehicle. In some embodiments, the transceivers 202a-202n at the vehicle may be installed or placed at locations such that the transceivers may establish communication links outside a range of elevation angle capabilities of one or more antenna arrays associated with the transceivers. In some examples, a vehicle may include a transceiver 202a-202n mounted on the vehicle's roof and/or at another location such that the transceiver may generate a narrow communication link (e.g., a communication link with a conical beam, a tapered beam, and/or the like), which may be directed forward and at an upward angle to communicate with roadside units (e.g., the transceivers may be mounted on street lights, road signs, pedestrian devices, and/or the like).

The system 200 may also include one or more other devices and related applications for collecting information via other radio technologies such as DSRC using WiFi or cellular vehicle-to-everything (C-V2X), which may be at a lower data rate, e.g., 200 Mbps. The system 200, based on the collected information, may configure and/or control the transceivers 202a-202n.

In some embodiments, information of the location of the antennas 203a-203n associated with the transceivers 202a-202n at a vehicle may be included in the configuration information of the transceivers 202a-202n and/or the system 200. For example, the transceiver 202a and/or its antenna 203a might be located at the front of a vehicle. The transceiver 202a may store the location of the antenna 203a at the vehicle as well information about the distance from the antenna 203a to the ground, the distance from the antenna 203a to a nearby surface of the vehicle, the vertical/horizontal angles of the antenna 203a, or other information related to the vehicle where the antenna 203a is located. The configuration information may include a relative angle of a boresight of the antenna with respect to a reference point on the vehicle. The boresight information may provide a reference for both azimuth and elevation beam steering. A transceiver 202a-202n may determine its configuration information based on the location of the transceiver 202a-202n and/or the location of a corresponding antenna 203a-203n at a vehicle.

The system 200 may include various control signals that, for example, may be communicated by and among the transceivers 202a-202n, the host CPU 204, the sensors 210, and/or other systems at the vehicle that are in communication with the system 200. Table 1 below includes examples of the control signals. For example, the control signals may be discrete control inputs to the transceivers 202a-202n, may be configured via memory mapped registers at the transceivers through an external parallel bus or serial bus (e.g., PCI, AMBA, USB, Ethernet, PCIe, I2C, SPI, CANbus, and/or the like), or a combination of discreet and memory mapped controls. To assist with antenna steering, one or more other wireless systems, such as dedicated short-range communications or cellular vehicle-to-everything (C-V2X), may provide additional control functions. In some examples, each transceiver 202a-202n may be enabled or disabled, directly or indirectly, by another wireless system such as DSRC or C-V2X. For example, a transceiver located at the right-rear of a vehicle may be enabled, if a transceiver at the center-rear of the vehicle is disabled. The control functions may be based, for example, on information about what vehicles are in a given area, such as a DSRC radio's global knowledge.

TABLE 1

| Signals | Functionality |
| --- | --- |
| control_en | Each control function may have an independent enable signal. |

TABLE 1-continued

| Signals | Functionality |
| --- | --- |
| array_control | An indication as to which set of beam configurations may be the default or favored when attempting to perform beam/antenna steering. The indication may be linked to the location of the antennas 203a-203n at the vehicle. The indication may also be provided for detection and beam alignment. |
| rel_velocity | A signal from the host CPU 204 indicating a velocity of the vehicle relative to a peer vehicle for a specific transceiver 202a-202n. The signal may include a vector indicating a speed and direction or a scalar indicating the relative speed of the vehicles. The relative speed may be along a specific geometrical axis, or may be based on the respective speeds of the vehicles traveling in the same direction determined, for example, from a speedometer sensor. Each radio transceiver 202a-202n may have the capability to determine relative velocity using techniques associated with a wireless link. The transceiver may, internally or through an external control function, switch between a relative velocity determined by an external sensor or control function and a relative velocity determined by the transceiver via a wireless link to a peer vehicle. |
| distance | The host CPU 204 may provide an indication of a vehicle-to-vehicle distance, which may be along a radial of a wireless link or a projection onto a relevant axis, such as an axis that is parallel to a direction of travel. A transceiver 202a-202n may use the distance as an input. Alternatively and/or additionally, the transceiver 202a-202n may be configured to use a distance measurement determined by the nodes of the wireless link based on an appropriate link distance protocol. |
| radio_busy | Each transceiver 202a-202n may provide a busy indicator which indicates that the transceiver is currently linked with a peer vehicle. |
| handoff_req | A transceiver 202a-202n at a vehicle may initiate a handoff of a communication link to a neighboring transceiver 202a-202n at the vehicle. |
| handoff_grant | A handoff process may include a handoff request by one transceiver 202a-202n and a handoff grant handshake by another transceiver 202a-202n. The handoff process may be executed directly by two transceivers 202a-202n and/or via the host CPU 204. |

Figure 2B:
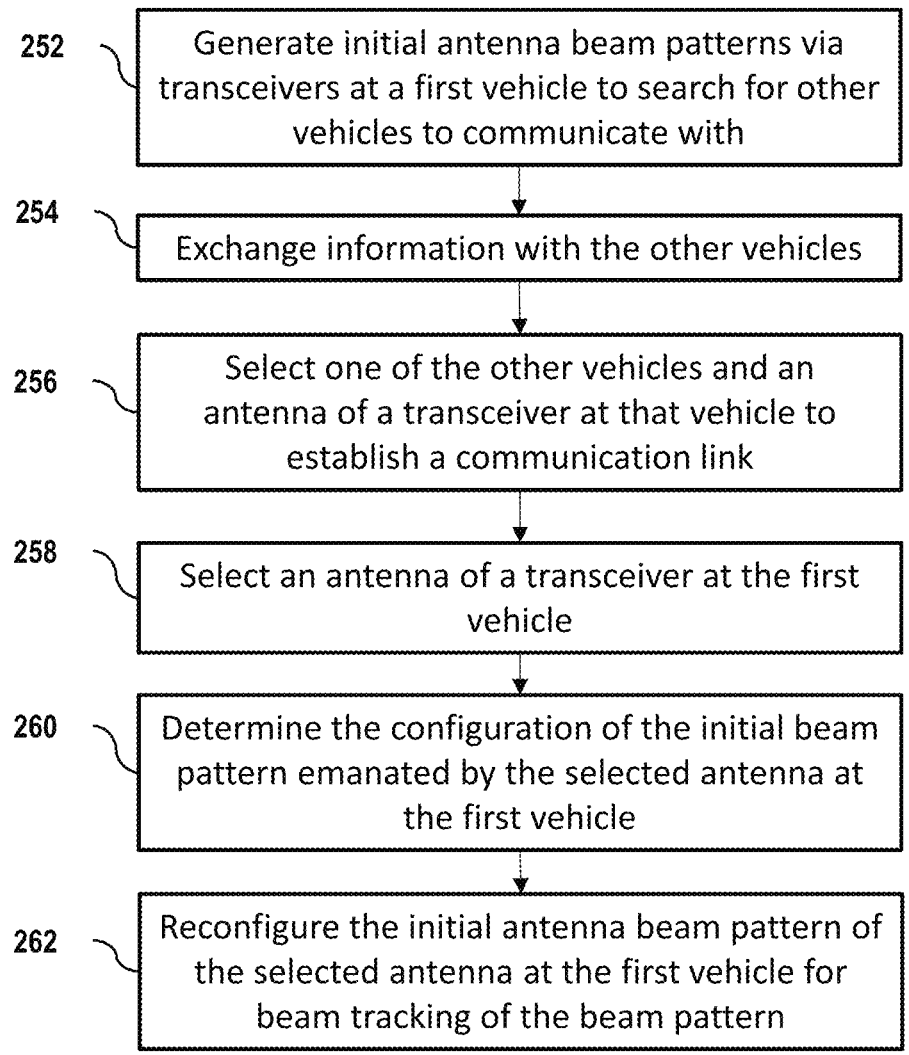
FIG. 2B depicts an example of a process flowchart for configuring antenna beam patterns, in accordance with some example embodiments.

FIG. 2B depicts a diagram 250 of an example of a process flowchart for configuring antenna beam patterns, in accordance with some example embodiments. Referring to FIGS. 1 and 2A, the process 250 may be performed by the system 200 of FIG. 2A. Although specific instances of transceivers 202a-202n such as transceiver 202a, transceiver 202b, or the like may be referenced in the examples below, references to a specific transceiver or other elements are for clarity and not limiting to any specific transceiver 202a-202n or element in the system 200.

In some example embodiments, as a first vehicle is traveling along a road, the system 200 or a user at the first vehicle may determine that it may be necessary or advantageous to establish communication links to other vehicles or objects to exchange data. For example, the system 200 may establish communication links to other vehicles to exchange sensor data for safety, caravanning, dynamic navigation, and/or the like. The communication links may support the exchange of large amounts of data with a low latency. In some examples, a transceiver 202a-202n, with assistance from an external control function (e.g., a DSRC radio) may establish a link with a peer vehicle. The DSRC radio may track the location of peer vehicles within a given local area (e.g., vehicles within hundreds of meters). The external control function may then determine a timing to enable a specific transceiver at a vehicle, as well as determine an initial beam direction for the transceiver to use to attempt to form a link with a peer vehicle.

At 252, the system 200 at the first vehicle may generate one or more initial antenna beam patterns to search for other vehicles to establish one or more communication links with those vehicles. Referring to FIG. 2A, to establish a communication link, the system 200 at the first vehicle may request for the transceivers 202a-202n to generate one or more initial antenna beam patterns to search for other vehicles. In some embodiments, the initial antenna beam patterns may have a broad beam pattern. Referring to FIG. 1, the antennas at the vehicles 102a-102d may generate one or more broad antenna beam patterns, including broad antenna beam patterns 120a, 120b, 120c, and/or the like. The widths of the antenna beam patterns, whether narrow or broad, may depend on various factors, including the physical configuration of each antenna, the amplitude and phase of a signal supplied to each antenna, location of each antenna at the vehicle, and/or the like.

At 254, the initial antenna beam patterns may be configured to broadcast information about the system 200 at the first vehicle, and to receive similar information from and about the other vehicles. Referring to FIG. 2A, the broadcasted information may include, for example, the quantity, type, identification, and locations of the transceivers 202a-202n and their corresponding antennas 203a-203n at the first vehicle. The broadcasts from the other vehicles may include similar information about each of the other vehicles. The broadcasts may include information items that may be of interest or necessary in establishing communication links between the vehicles. The broadcast information may include information about the user of the vehicle, whether the system 200 has wireless communication connectivity via a cellular radio, and/or the like.

At 256, the system 200 at the first vehicle may select, from one of the other vehicles, a second vehicle with which to establish a communication link. Furthermore, the system 200 at the first vehicle, based on the information received from the second vehicle, may select, at the second vehicle, an antenna for establishing the communication link. Selecting the antenna at the second vehicle may be based on antenna information received from the second vehicle, including an orientation of the antenna at the second vehicle, a location of the antenna at the second vehicle, and/or the like.

At 258, the system 200 at the first vehicle may select, at the first vehicle, a transceiver and its corresponding antenna that may have an established a communication link with the second vehicle. In some embodiments, the system 200 at the first vehicle may select an antenna at the first vehicle based on one or more factors, including a location of the antenna at the first vehicle, an orientation of the antenna at the first vehicle, a gain of the antenna at the first vehicle, a location of a target antenna at the second vehicle, a speed of the first vehicle relative to the second vehicle, a distance between the first vehicle and second vehicle, and/or the like. As shown in FIG. 1, a vehicle may be equipped with a plurality of transceivers and antennas. As noted above, each circle in FIG. 1 (e.g., 104a at vehicle 102a and 106a at vehicle 102b) represents a location of a radio transceiver and its antenna array. For example, vehicle 102a may be equipped with radios/antennas 104a-104n, vehicle 102b may be equipped with radios/antennas 106a-106n, vehicle 102c may be equipped with radios/antennas 108a-108n, and vehicle 102d may be equipped with radios/antennas 110a-110n. The radios/antennas 104a-104n, 106a-106n, 108a-108n, and 110a-110n in FIG. 1 may be the same as, or similar to, the transceivers 202a-202n and their associated antenna arrays 203a-203n of FIG. 2A.

At 260, the system 200 at the first vehicle may determine a configuration of an initial antenna beam pattern that is emanated and/or generated by the selected antenna at the first vehicle. Referring again to FIG. 1, the vehicle 102a may determine the configuration of its initial antenna beam patterns such as the broad antenna beam pattern 120a. The determination may be based on one or more factors, including a physical configuration of an antenna 104a-104n, an amplitude and/or phase of a signal supplied to the antenna 104a-104n, a location of the antenna 104a-104n at the vehicle, and/or the like.

In some embodiments, a transceiver may have access to locally stored or remotely stored configuration information that indicates the location of the antennas at the vehicle. For example, the transceiver 202a in FIG. 2A may receive from the host CPU 204 information indicating that the transceiver 202a and/or its antenna 203a are located at the center-rear of the vehicle. Alternatively and/or additionally, a transceiver 202a-202n may determine the location of its antenna 203a-203n at a vehicle based on the location information of other transceivers 202a-202n and their antennas 203a-203n at the vehicle.

At 262, based on the initial antenna beam pattern generated by the selected antenna at the first vehicle, the system 200 at the first vehicle may reconfigure the initial antenna beam pattern. Referring again to FIG. 1, a transceiver at the vehicle 102a may reconfigure an initial broad antenna beam pattern, such as beam 120a, and generate a narrower antenna beam pattern such as beam 112, which may have already established a communication link with a vehicle, such as the vehicle 102b, that is proximate (e.g., within the wireless range, within line of sight, etc.) to the first vehicle. The reconfiguration of the antenna beam pattern (e.g., beam steering) may cause an antenna beam pattern to change a beamwidth and/or a range. The reconfiguration of the antenna beam pattern may be accomplished by changing a one or more factors, such as an amplitude and/or phase of a signal that is applied to each of the antenna elements of an antenna such as antenna 104n. In some embodiments, the reconfiguration of the antenna beam pattern may be based on a target data rate for a communication link associated with an antenna beam pattern. For example, the system 200 at a vehicle may determine that a communication link should support a 100 Mbs data transfer rate and reconfigure the antenna beam pattern accordingly.

In some embodiments, the system 200 may determine a rate for the reconfiguring an antenna based on one or more factors, including the determined location of the radio/antenna, the determined configuration of the radio/antenna, a velocity of the first vehicle relative to one or more other vehicles proximate to the first vehicle, an orientation of a selected antenna emanating the antenna beam pattern, and/or the like. Alternatively and/or additionally, the reconfiguring may be based on a steering angle associated with the selected antenna and a distance between the first vehicle and one or more other vehicles near the first vehicle.

In some embodiments, the system 200 may determine, based on a field of operation of the selected antenna, an amplitude and a phase for the reconfiguring. The system 200 may then apply the amplitude and the phase to the selected antenna for reconfiguring the antenna.

Once a communication link such as 112 in FIG. 1 is established, the system 200 may continue generating other antenna beam patterns, such as beam 120a, while searching for other vehicles or objects. Alternatively and/or additionally, once a communication link such as communication link 112 is established, the system 200 may discontinue other antenna beams such as beam 120a to, for example, optimize the performance of the system 200 by reducing power consumption, or by reducing possible interference with established communication links, such as the communication link 112.

In some embodiments, the reconfiguration of an antenna beam pattern may be based on a distance to a target communication object such as a nearby vehicle or a roadside unit. The transceivers 202a-202n, based on information available from the sensors 210, may determine the distance to the target communication object. In some example embodiments, the reconfiguration of an antenna beam pattern may be based on a target data rate that is to be transmitted via a communication link associated with the antenna beam pattern. Moreover, the reconfiguration of an antenna beam pattern may be based on a relative velocity between a vehicle and the target communication object, which may be moving or stationary.

Figure 3:
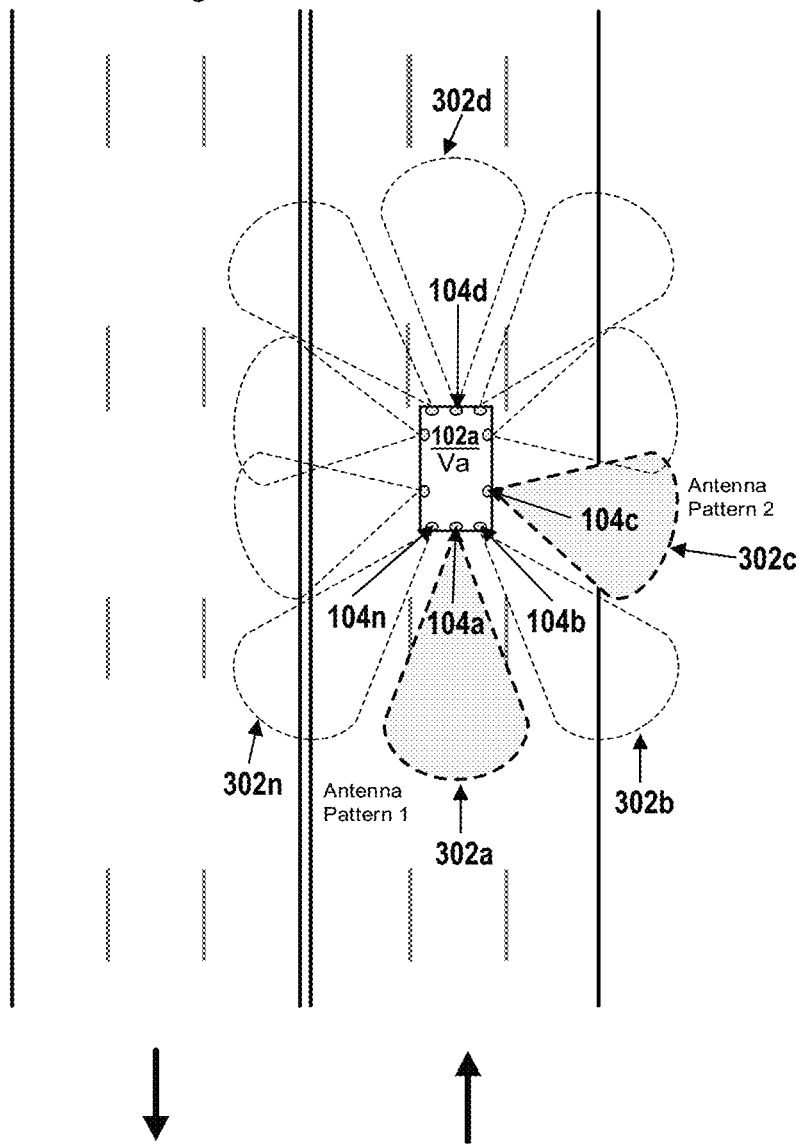
FIG. 3 and FIG. 4 depict diagrams of antenna beam patterns, in accordance with some example embodiments.

FIG. 3 depicts a diagram 300 of antenna beam patterns, in accordance with some example embodiments. The system 200 at the vehicle 102a may include antennas 104a-104n configured to generate a plurality of antenna beams 302a-302n. In some embodiments, when searching for other vehicles that may include other transceivers and antennas, the antennas 104a-104n may generate broader antenna beam patterns. However, when another vehicle is detected and before or after a communication link is established, one or more of the antennas 104a-104n may switch to a narrower beam pattern.

To illustrate further, the antennas 104a-104n at the vehicle 102a may generate one or more of the antenna beam patterns 302a-302n that have a broader beam pattern, such as plus or minus 60 degrees, when searching to establish a link with another vehicle. However, one or more of the antenna beam patterns 302a-302n may be reconfigured to a narrower beam pattern such as plus or minus 30 degrees after the link is established or when the other vehicle's transceivers or antennas are detected and/or located. The reconfiguration may be based on information such as the data rate, the quality of service, the possible duration of the link, and the like related to one or more links that may already be established or may be established with an identified vehicle or object. Therefore, depending on when that information may be available and/or determined, the beams 302a-302n may be reconfigured either before or after establishing a communication link.

Although FIG. 3 depicts similar antenna beam patterns, the antenna beam patterns include beam patterns that may vary based on the number of antennas 104a-104n of the vehicle 102a or based on a distance to a peer vehicle or roadside unit. For example, the antennas 104a-104n at a vehicle with fewer antennas may generate wider antenna beam patterns than antennas 104a-104n at a vehicle with a greater number of antennas. Nonetheless, the issues of detecting a peer vehicle, fast ad-hoc link establishment, beam alignment, beam tracking, data rate switching, and link hand-off may be resolved in a similar manner whether a vehicle includes more or fewer antennas 104a-104n than a peer vehicle. For example, each antenna 104a-104n at a vehicle might be configured according to the number of antennas 104a-104n on that vehicle. However, an antenna 104a-104n at a vehicle with a greater number of antennas 104a-104n may establish one or more communication links similar to an antenna 104a-104n at a vehicle having fewer antennas 104a-104n.

As shown in FIG. 3, the antenna beam patterns 302a-302n may be optimized based on the location of the respective antennas 104a-104n at the vehicle 102a. An antenna 104a-104n may be configured to establish and/or maintain a communication link at a certain region about the vehicle 102a. For example, the antenna 104c may generate a wider side antenna beam pattern 302c while the forward or rearward facing antennas 104d and 104a generate the narrower antenna beam patterns 302d and 302a, respectively.

Alternatively or additionally, the system 200 (e.g., a host CPU 204 or another element) at a vehicle may configure an antenna 104a-104n. For example, based on radar information from the sensors 210 in FIG. 2A, the system 200 may determine that a peer vehicle or an object is within the range of the vehicle 102a and configure one or more of the antennas 104a-104n.

Moreover, the transceivers 202a-202n, of FIG. 2A, may be configured to receive or to transmit based on a duty cycle, which indicates a ratio or a period of time a transceiver 202a-202n may operate to receive a radio signal or to transmit a radio signal. For example, the transceiver of the rearward antenna 104a, of FIG. 3, that generates the antenna beam pattern 302a may have a transmit duty cycle of 80 percent and a receive duty cycle of 20 percent. The transceiver of the forward antenna 104d that generates the antenna beam pattern 302d may have a transmit duty cycle of 20 percent and a receive duty cycle of 80 percent. The antenna beam patterns and transmit/receive duty cycles of each transceiver may be configured to optimize the likelihood of a successful detection of a peer vehicle, establishing a communication link, and an anticipated bias in the directionality of data throughput demands. Moreover, a duty cycle profile at the system 200 may manage the operation and power consumption of the transceivers 202a-202n when vehicles or roadside units are sparse.

Before establishing a communication link, each of the plurality of transceivers at a vehicle may be configured to transmit a pre-link message at a lower data rate through a broader antenna beam pattern. For example, the antenna 104a, based on the configuration of its corresponding transceiver, may generate an antenna beam pattern at a maximum beamwidth. The maximum beamwidth may broadcast a default message so that nearby peer vehicles or roadside units might be able to receive the message. With a broader antenna beam pattern, the range and probability of successful data reception by a peer vehicle may be increased. The data transmitted via an initial antenna beam pattern may include a short message indicating that a source vehicle is searching to establish a communication link with a peer vehicle or a roadside unit.

Figure 4:
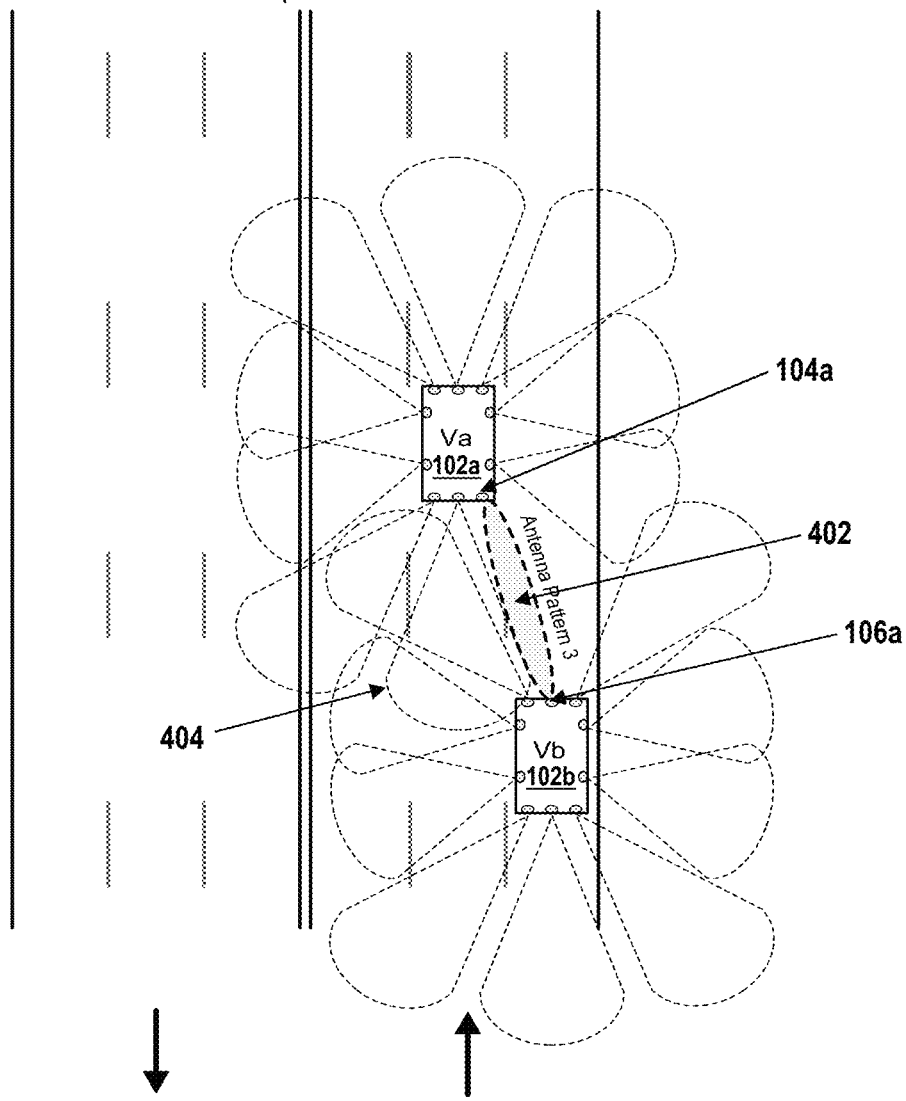

FIG. 4 depicts a diagram 400 of antenna beam patterns, in accordance with some example embodiments. The vehicles Va 102a and Vb 102b may have already detected one another and formed an ad-hoc peer-to-peer link 402. The antenna 104a at the vehicle 102a and antenna 106a at the vehicle 102b may initially establish a link with a broader antenna beam, for example, antenna beam 404. Then the beamwidth may be reduced to a narrower beamwidth such as antenna beam 402 after performing a beam alignment. It should be noted that the antenna beamwidth need not change. However, decreasing the antenna beamwidth may increase a link margin providing for an increase in the communication link data rate. For example, a communication link established via an antenna beamwidth of plus or minus 15 degrees may provide a higher data rate than a communication link established via an antenna beamwidth of plus or minus 60 degrees. However, based on the configuration information, such as location and orientation of the antennas 104*a* and 106*a* and the relative velocity of peer vehicles, an initial communication link via a narrow beamwidth may be established.

In the system 200 of FIG. 2A, an established communication link may be handed off from one transceiver 202*a*-202*n* to another transceiver 202*a*-202*n* at the same vehicle. For example, a handoff of an established communication link may be based on factors such as the locations and current configurations of the antennas 203*a*-203*n* at a vehicle, and the relative velocity of the peer vehicles having established the communication link.

In some example embodiments, a vehicle may include dedicated short-range communication or cellular vehicle-to-everything (C-V2X) radio systems. Those radio systems may provide information for establishing and controlling high data rate communication links implemented by the system 200. In a scenario where a vehicle is not equipped with a system 200, other radio systems dedicated to short-range or cellular vehicle-to-everything communications at the vehicle may establish communication links with vehicles that are equipped with a system 200. Moreover, secured ad-hoc communication links may be established based on the dedicated short-range communication and cellular vehicle-to-everything security features such as key exchange.

Beamforming may increase the gain of transmit and receive antennas. Beamforming may be performed by analog, digital, and/or hybrid beamforming. In each approach to beamforming, a set of weighting factors such as amplitude and phase may be applied to each individual element in an antenna. For example, the weighting factors may be applied to the antenna 104*a* to form a region or an antenna beam pattern that may provide for a greater transmit and receive power compared to the power of an individual antenna element in an antenna such as the antenna 104*a*. The combined antenna beam patterns generated by the elements of an antenna such as 104*a* may form a narrower beam, wherein the narrower beam may be steered by changing the set of weighting factors.

A set of weighting factors (e.g., linear weights, exponential weights, logarithmic weights, conditional weights, and/or the like) for each element in an antenna such as 104*a* may be referred to as a sector configuration or antenna configuration. A full set of sectors may sweep the peak of an antenna beam through a range of angles relative to an optical axis of a directional antenna (boresight) with an angle of zero degrees. Antenna patterns within the steering angles of about plus or minus 60 degrees may provide better steering capability of the elements in an antenna such as 104*a*. Antennas such as 104*a* and 106*a* with various configurations and spacing may generate a range of different antenna beam patterns. It is noted that the term "antenna configurations" used herein may suggest "steering angles," "steering in elevation," or modifying a "beam width."

Figure 5:
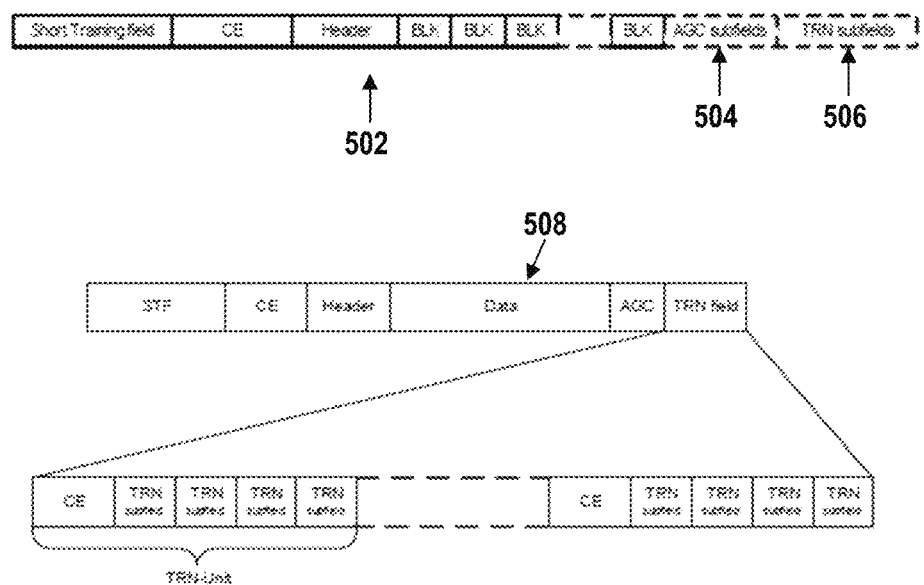
FIG. 5 and FIG. 6 depict an example of packet structures for a beam refinement protocol packet, in accordance with some example embodiments.

FIG. 5 depicts a diagram 500 of an example of packet structures for a beam refinement protocol packet in the IEEE 802.11-2016 standard, in accordance with some example embodiments. As used herein, a beam tracking packet may refer to a beam refinement protocol packet.

In a linked state, each vehicle may, based upon a variety of factors, perform beam steering of its antenna array. The beam steering may be performed to provide incremental improvements in the link quality of two relatively equal velocity vehicles or may be performed to rapidly adjust beam angles to maintain a link for vehicles of high relative velocity. For conditions of high relative velocity (e.g., while a vehicle has stopped and another vehicle in a side lane travels at 65 MPH), the beam update period may be on the order of hundreds of microseconds, while for conditions of low relative velocity the update period may be several seconds. In either case, the required update period may be at least an order of magnitude greater than the period of an individual packet. This range of update periods may imply that beam adjustments may be effectively accomplished using an exchange of packets with extensions similar to those used for the IEEE 802.11ad BRP.

In an IEEE 802.11ad single carrier packet 502, the automatic gain control (AGC) subfield 504 and training (TRN) subfield 506 may be appended to the end of the packet 502. The AGC 504 and TRN 506 subfields may be for determining refinements of an antenna configuration. A large portion of the available data throughput via a communication link may be consumed by the TRN subfields 506 when a relatively large number of antenna configurations may need to be trained. To reduce this overhead, the location and mounting orientation of an antenna at a vehicle, and the velocity of the vehicle relative to a peer vehicle may be referenced to reduce both the number of configurations trained and the rate of training. For conditions of low relative velocity, the beams may be incrementally adjusted by using an exchange of beam refinement protocol packets where the process is executed at a lower data rate. For conditions of high relative velocity, the exchange of beam refinement protocol packets may be nearly continuous and limited by the length of the packets and the conditions of the communication link.

The beam refinement protocol type process may be performed at a rate determined by each individual transceiver at a vehicle. For example, an antenna located at the center-rear of a vehicle may maintain a lower rate of beam steering adjustments even when at a high relative velocity. However, for a similar relative velocity when an antenna is located on a side or side-rear of the vehicle, the rate of beam steering adjustments may be higher. When performing the beam refinement protocol process, each transceiver may determine the antenna designed field of operation to limit the total range of beam angles for a given refinement process. Constraining the range of beam angles in this way may prevent inadvertent beam steering and further minimize non-data overhead. Location of an antenna and its current beam steering angle may be referenced to further limit the number of antenna configurations evaluated for each beam refinement procedure.

If the beam steering is to be updated, the rate of beam steering updates may be set based on the current relative velocity of the vehicles or based on a filtered version of the relative velocity. For example, the relative velocity referenced by a transceiver to determine the beam steering update period may be based on a moving average of the relative velocity. In a low relative velocity, a transceiver, based on its communication link metrics, may vary the number of evaluated antenna configurations and/or the training rate as required. For example, if the relative velocity and the training rate are low, but a signal to noise ratio (SNR) link metric indicates a poor link, then the transceiver may update the rate of beam refinement checks and/or the span of antenna configurations. Other link metrics, such as a received signal strength indicator (RSSI) or a link quality indicator (LQI), may be used to set the rate of the beam steering updates. Relative velocity may be estimated based on a rate of change of a link metric and/or a rate of change of the antenna configuration.

In case a communication link is lost, a transceiver may evaluate a plurality of possible antenna configurations in an attempt to re-establish the communication link. Since the beam refinement protocol process may rely on the communication link metrics, which may include statistical variance, a filtering process may remove possible jitter or drift from the overall steering process. A predictive filter, such as the Kalman filter, may be considered to improve the overall tracking performance of the system 200. A criteria and/or a threshold may be applied either to an allowed magnitude of a steering angle change or to the magnitude of the link metric in determining a better configuration.

In some embodiments, antenna beam patterns with different widths may be formed in different directions. An antenna may be configured such that the elevation of the antenna beamwidth is larger compared to the azimuth of the beamwidth. Such configuration of antennas may overcome the variations in the height of the vehicle on which the antennas may be installed. In millimeter-wave wireless systems, such as IEEE 802.11ad, IEEE 802.11ay, or Third Generation Partnership Project (3GPP) 5G-NR cellular, beamforming may operate beyond a distance of ten meters between peer communication nodes. For example, operating at data rates above 1 Gbps at a range of 100 meters, an overall antenna gain of about 30 dBi may be required. For example, a 30 dB overall gain may be achieved by using sixteen transmit and four receive antenna elements. Such a configuration may be approximated by using the equation of:

$$10 \log_{10}((N_{tx})^2 \cdot N_{rx}),$$

wherein $N_{tx}$ indicates the number of transmit antenna elements and $N_{rx}$ indicates the number of receive antenna elements.

Different aspects of the IEEE 802.11ad directional multi-gigabit (DMG) technology may be used in implementing the system 200 discussed herein. For example, a method similar to the beam refinement protocol may track the transmit (Tx) and receive (Rx) antenna configurations. As noted, the training subfields 504 and 506 may be appended to the end of a data packet 508 in FIG. 5, and either of the Tx or Rx antenna configurations may be evaluated. For a Tx antenna configuration refinement, the initiating communication node may transmit training fields for each of the configurations intended for inspection and, a responding communication node may perform a quality check for each antenna configuration and return the appropriate information in an acknowledge packet. For an Rx antenna configuration refinement, the initiating communication node may request for the responding communication node to send a packet with the training fields. All fields may be transmitted by the responding communication node by using the same antenna configuration for the main body of the packet, wherein the initiating communication node may switch its Rx antenna configuration while receiving the training subfields. Each communication node in a link may initiate a transmit or a receive beam refinement process for any number of antenna configurations at any required rate.

Figure 6:
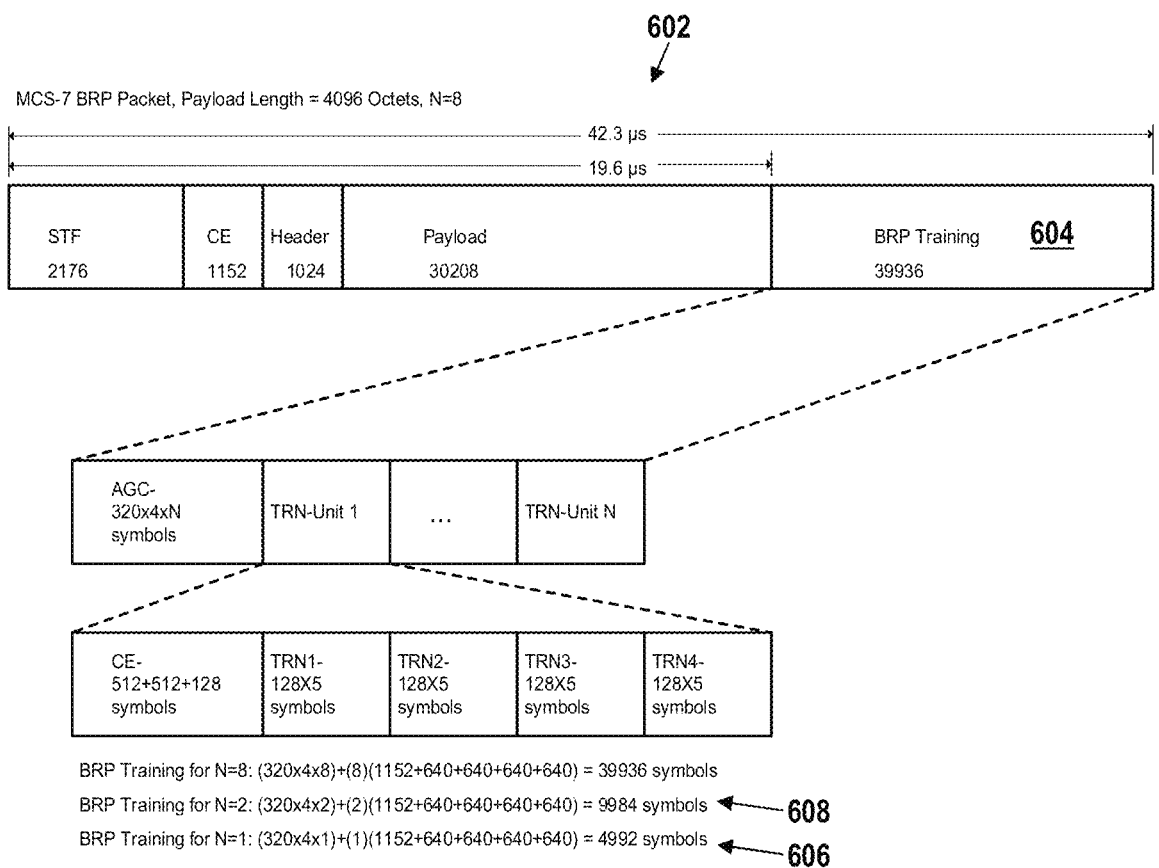

FIG. 6 depicts a diagram 600 of an example of packet structures for a beam refinement protocol packet, in accordance with some example embodiments. A packet 602 may include the total number of symbols transmitted for each field of a representative modulation and coding scheme (MCS)-7, 4096 octets, and 32 sector, or antenna configurations, beam refinement protocol packet. The IEEE 802.11ad MCS-7 packets provide a theoretical physical layer rate of 1.925 Gbps. For the implementation of the directional multi-gigabit beam refinement protocol training, the packet header may provide a training length of N where N times 4 is the total number of sectors, or antenna configurations, present in the appended training fields.

For a directional multi-gigabit packet, which inspects 32 sectors for either transmit or receive training, the training portion 604 of the packet may be longer than the body (STF, CE, header, and payload combined) of the packet 602. For example, substantial savings may be realized by inspecting only four (N=1), 606, or eight (N=2), 608, sectors. When present, the beam refinement protocol training fields 604 may not include data and may be considered as an overhead. If a communication link continuously sends beam refinement protocol packets while inspecting 32 sectors with each packet, then the theoretical physical layer data rate is reduced by more than half.

Figure 7:
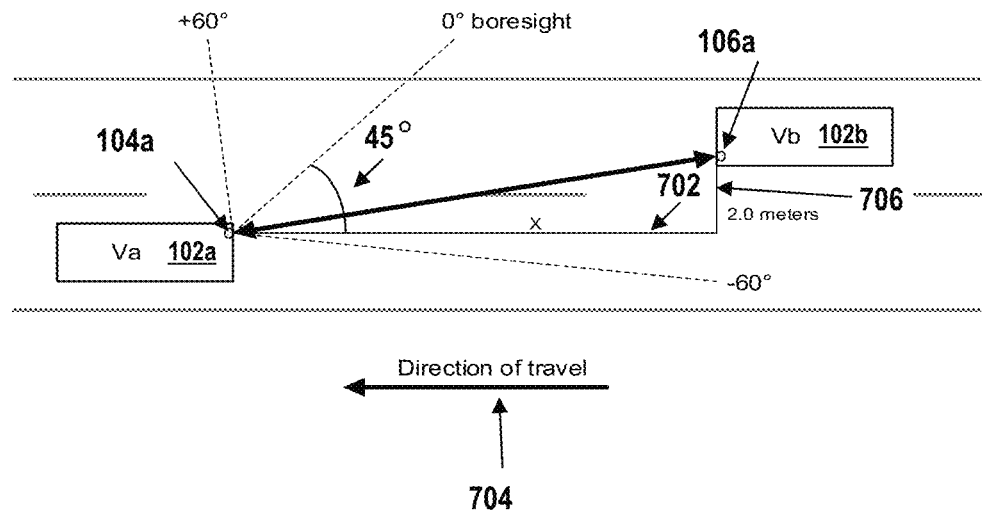
FIG. 7 depicts an example of a vehicle including the beam steering geometry of a transceiver, in accordance with some example embodiments.

FIG. 7 depicts a diagram 700 an example of a vehicle including the beam steering geometry of a transceiver, in accordance with some example embodiments. For example, the antenna 104a at the right-rear of a vehicle Va 102a has a boresight of 45 degrees relative to an axis 702 parallel to the direction of travel 704. The antenna 104a may form a communication link with an antenna 106a at vehicle Vb 102b in an adjacent lane, wherein the antenna 106a is at the left-front of the vehicle 102b. The vertical separation 706 is measured perpendicular to the direction of travel 704. For azimuth steering of an antenna array (see, e.g., FIG. 7), the range of antenna steering angles considered may be plus or minus 60 degrees with an azimuth angular resolution of 3.75 degrees, although other angles or resolutions may be implemented as well.

Figure 8:
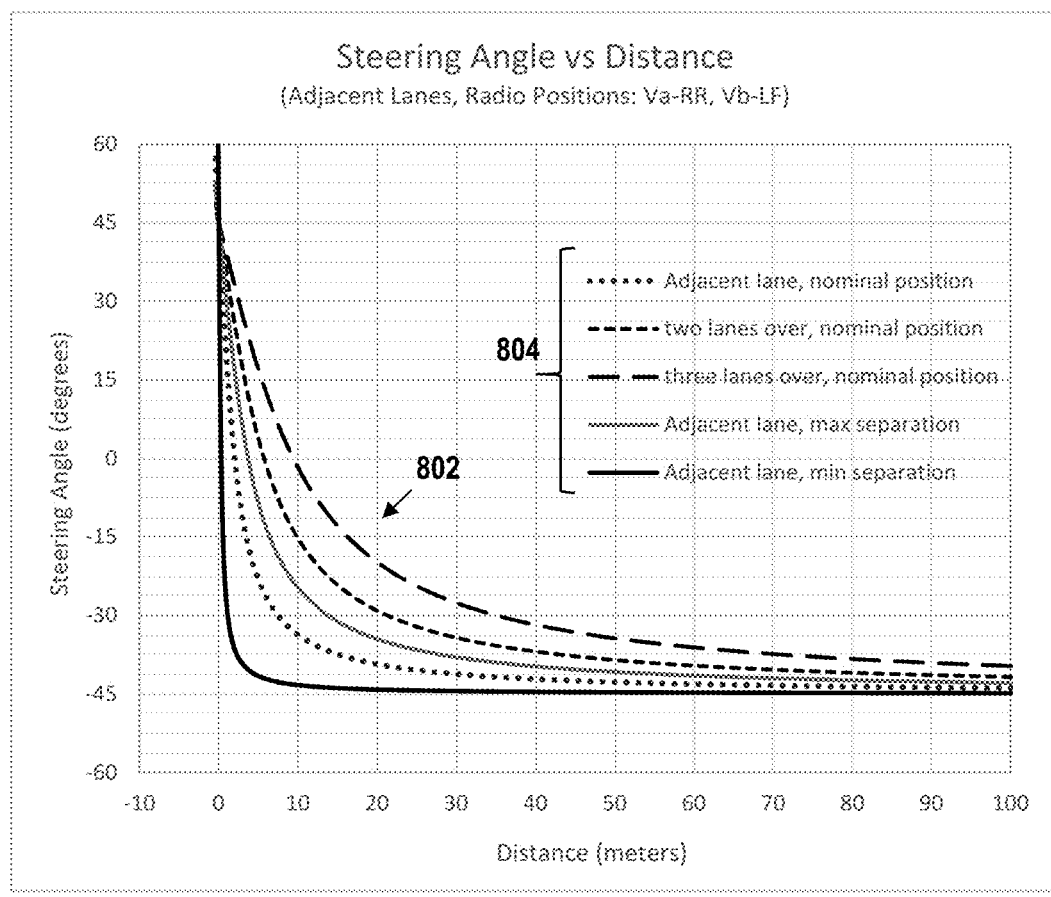
FIG. 8 depicts an example of a graph of steering angle versus distance, in accordance with some example embodiments.

FIG. 8 depicts a diagram 800 of an example of a graph of steering angle versus distance, in accordance with some example embodiments. Diagram 800 shows a graphical representation of the calculations for beam steering angle versus distance for several separations between the vehicles 102a and 102b in FIG. 7. Diagram 800 includes example curves 802 based on a range of separation between the vehicles 102a and 102b, for example, from 0.3 meters where the vehicles are closest to each other to 9.4 meters where the vehicles are nominally centered and three lanes apart as in the list 804.

For example, the number of trained steering angles may be based on the location of an antenna and a current beam steering angle. In diagram 800, for the antenna 104a in FIG. 7 at right-rear of vehicle 102a, four sequential beam steering angles (e.g., a steering range of 15 degrees) may be referenced when the current steering angle is less than minus 30 degrees. When the current steering angle is greater than or equal to minus 30 degrees, there may be eight steering angles. For example, if the current steering angle is greater than or equal to minus 30 degrees, four steering angles may be evaluated with each training iteration. However, rather than using contiguous angles separated by the angular resolution of the system, in this example, antenna configurations at 7.5 degrees per steering angle step may provide the range of 30 degrees for each training iteration. For larger angular steps such as 30 degrees, an initial training may be followed by a refined check using lower angular resolutions.

Referring again to FIG. 7, if a relative velocity vector is available, then the projection of the relative velocity in the direction perpendicular to the direction of travel 704 may assist in determining the specific set of antenna configurations evaluated. A positive relative velocity projection may be defined as vehicle 102*b* moving in a positive angular direction relative to vehicle 102*a* such that vehicle 102*b* is traveling closer to vehicle 102*a*. A negative relative velocity projection may be defined as vehicle 102*b* moving in a negative angular direction relative to vehicle 102*a* such that the distance between the two vehicles is increasing. In either case, the evaluated antenna configurations may be adjusted accordingly.

Referring again to FIG. 8, for a current steering angle of minus 33.75 degrees, and a positive relative velocity projection, a set of evaluated antenna configurations may include minus 26.25 degrees, minus 30.0 degrees, minus 33.75 degrees, and minus 37.5 degrees. For a negative relative velocity projection, the set of evaluated antenna configurations may include minus 30.0 degrees, minus 33.75 degrees, minus 37.5 degrees, and minus 41.25 degrees.

Figure 9:
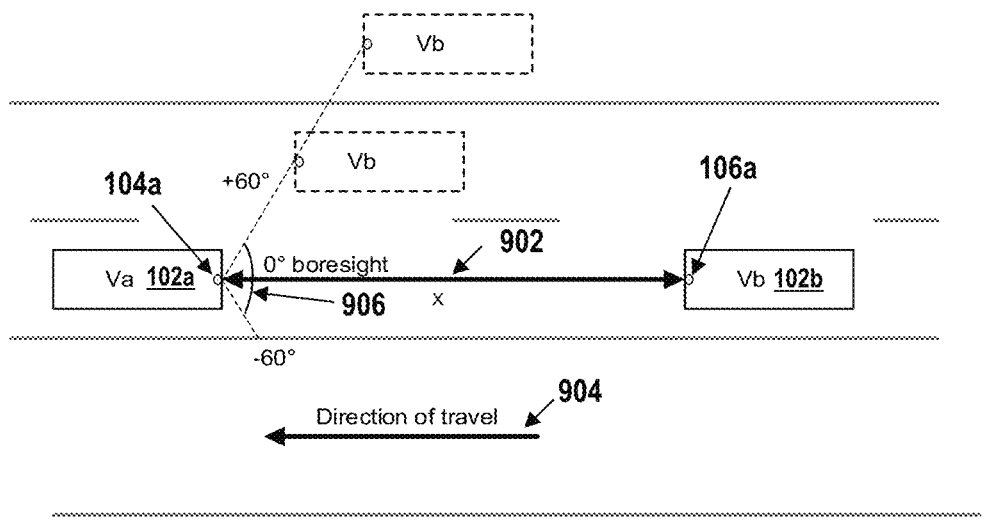
FIG. 9 depicts an example of a vehicle including geometry for steering angles, in accordance with some example embodiments.

FIG. 9 depicts a diagram 900 of an example of a vehicle including the geometry for steering angles, in accordance with some example embodiments. In diagram 900, an antenna 104*a* is at the center-rear of a vehicle Va 102*a* with a boresight 902 of zero degrees parallel to the direction of travel 904. The antenna 104*a* at the center-rear may form a link with another antenna 106*a* at vehicle Vb 102*b* traveling in the same lane and same direction. The antenna 104*a* may be configured to provide a range of beam steering angles 906. As such, the antenna 104*a* may be configured to provide a beam steering angle 906 between a minimum angle and a maximum angle, such as a beam steering angle between plus 60 degrees and minus 60 degrees.

Figure 10:
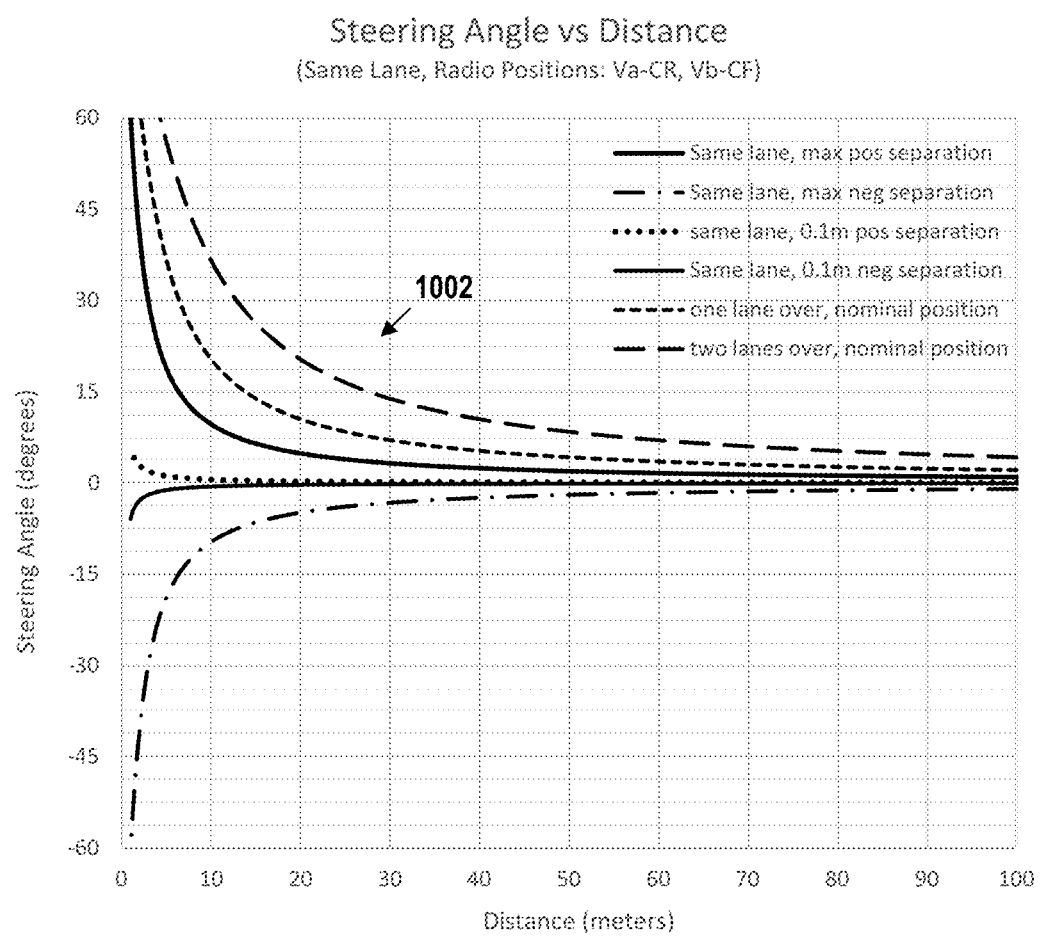
FIG. 10 and FIG. 11 depict examples of graphs of steering angle versus distance, in accordance with some example embodiments.

FIG. 10 depicts a diagram 1000 of an example of graphs of steering angle versus distance, in accordance with some example embodiments. The set of curves 1002 are based on the example of FIG. 9 such that for a center-rear antenna 104*a*, four sectors may be evaluated when the current steering angle is between plus or minus 15 degrees, and eight sectors may be evaluated when the absolute value of the current steering angle is greater than or equal to 15 degrees. Based on a relative velocity projection, a similar bias to the specific set of evaluated configurations may be added.

Figure 11:
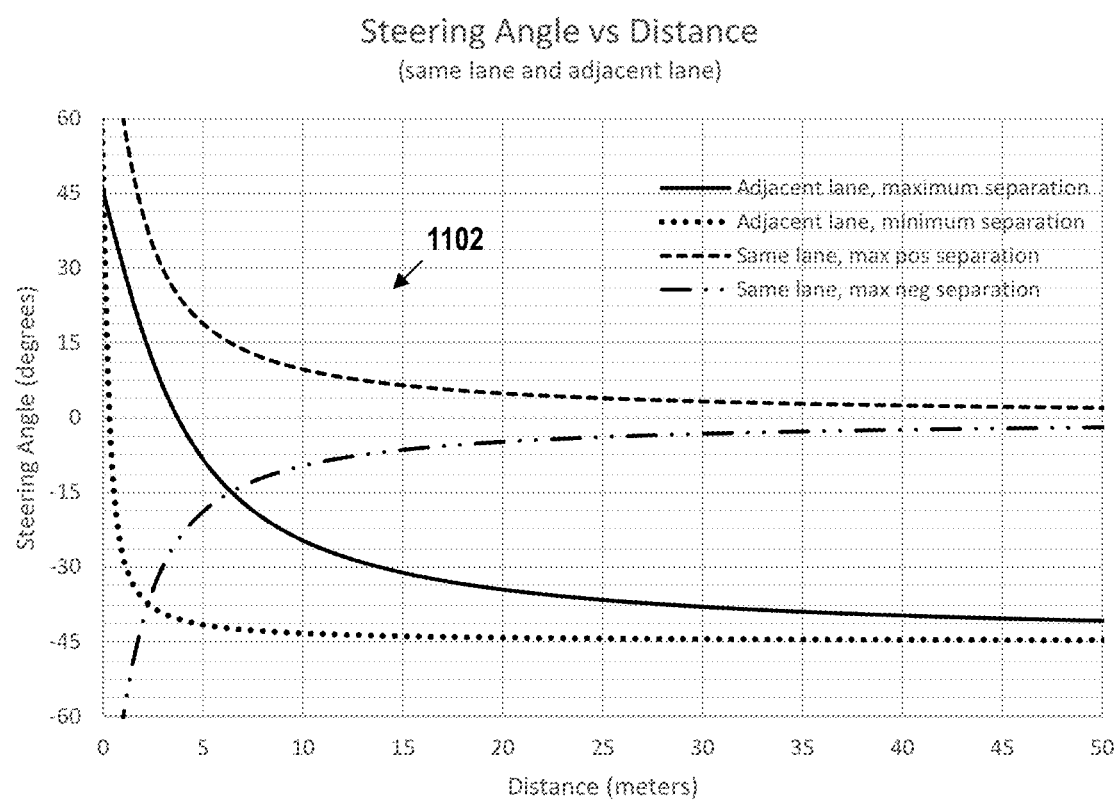

FIG. 11 depicts a diagram 1100 of an example of graphs of steering angle versus distance, in accordance with some example embodiments. The graphs show an overlay of the example antenna tracking profiles of the antenna locations discussed with reference to the examples in FIG. 7 and FIG. 9. For example, where different antennas, such as 203*a*-203*n* of FIG. 2A, at a vehicle form narrow beams with a steering range of plus or minus 60 degrees to achieve a target distance for a communication link, the steering angle curves 1102 may be different for each antenna. The number of trained sectors, or configurations, and the training rate for each antenna may be different and may be based on the location of each antenna 203*a*-203*n* at the vehicle.

Figure 12:
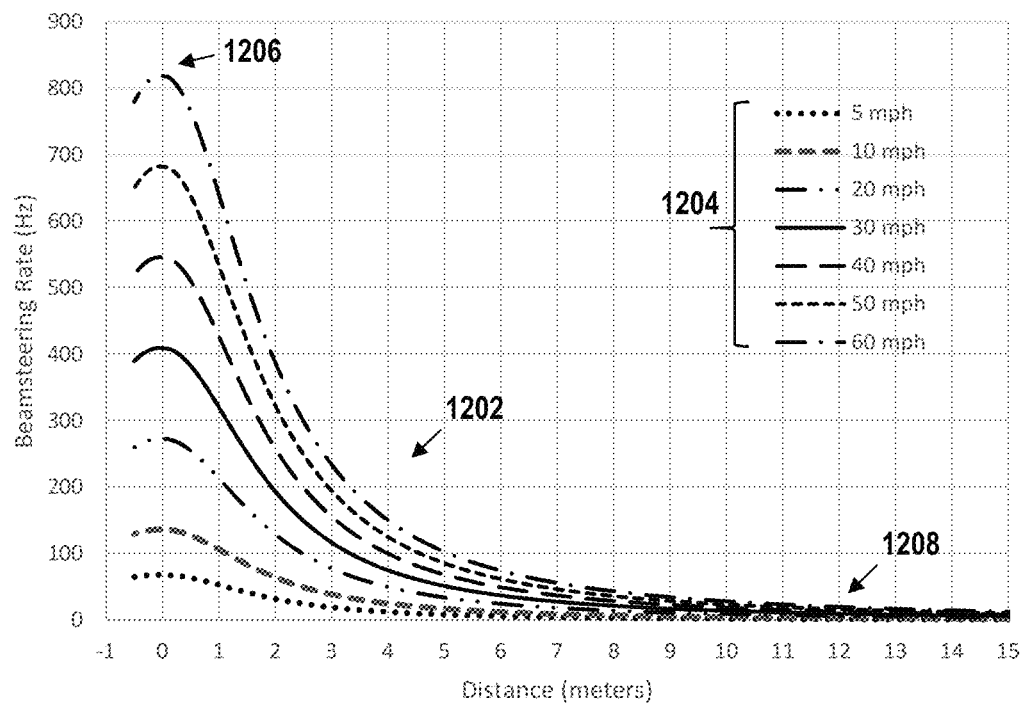
FIG. 12 and FIG. 13 depict examples of graphs of beam steering rate versus distance, in accordance with some example embodiments.

The rate of execution of the beam refinement process may be set based on the antenna location, the current steering angle, and the absolute value of the relative velocity between peer vehicles. FIG. 12 depicts a diagram 1200 of examples of graphs of beam steering rate versus distance, in accordance with some example embodiments. Diagram 1200 includes a set of beam steering rate curves 1202 for a right-rear mounted antenna, such as in of FIG. 7, with various relative velocities 1204. A relative velocity may be the difference in the speeds of vehicles 102*a* and 102*b* in the direction of travel in FIG. 7. For example, at short distances and for high relative velocities, the rate of beam refinement 1206 may be relatively high. For long distances, independent of relative velocities, the beam refinement rate 1208 may be lower. A beam steering rate may be estimated based on the absolute value of relative velocity of peer vehicles. In an example embodiment, the rate curves 1202, of FIG. 12, may be derived from a kinematic model based on a system's criteria. The rate curves 1202, and an associated antenna model, are based on a consideration that each antenna configuration represents a shift in the azimuth steering angle over a range of plus or minus 60 degrees with a resolution of 3.75 degrees. The rate curves 1202 may represent the rates associated with an azimuth angular change of one quarter of the system resolution. In some embodiments, the distance may be estimated from the current antenna configuration. The beam steering rate may be affected by the separation of the vehicles, therefore, the beam steering rate may increase as the distance between the vehicles is reduced.

Figure 13:
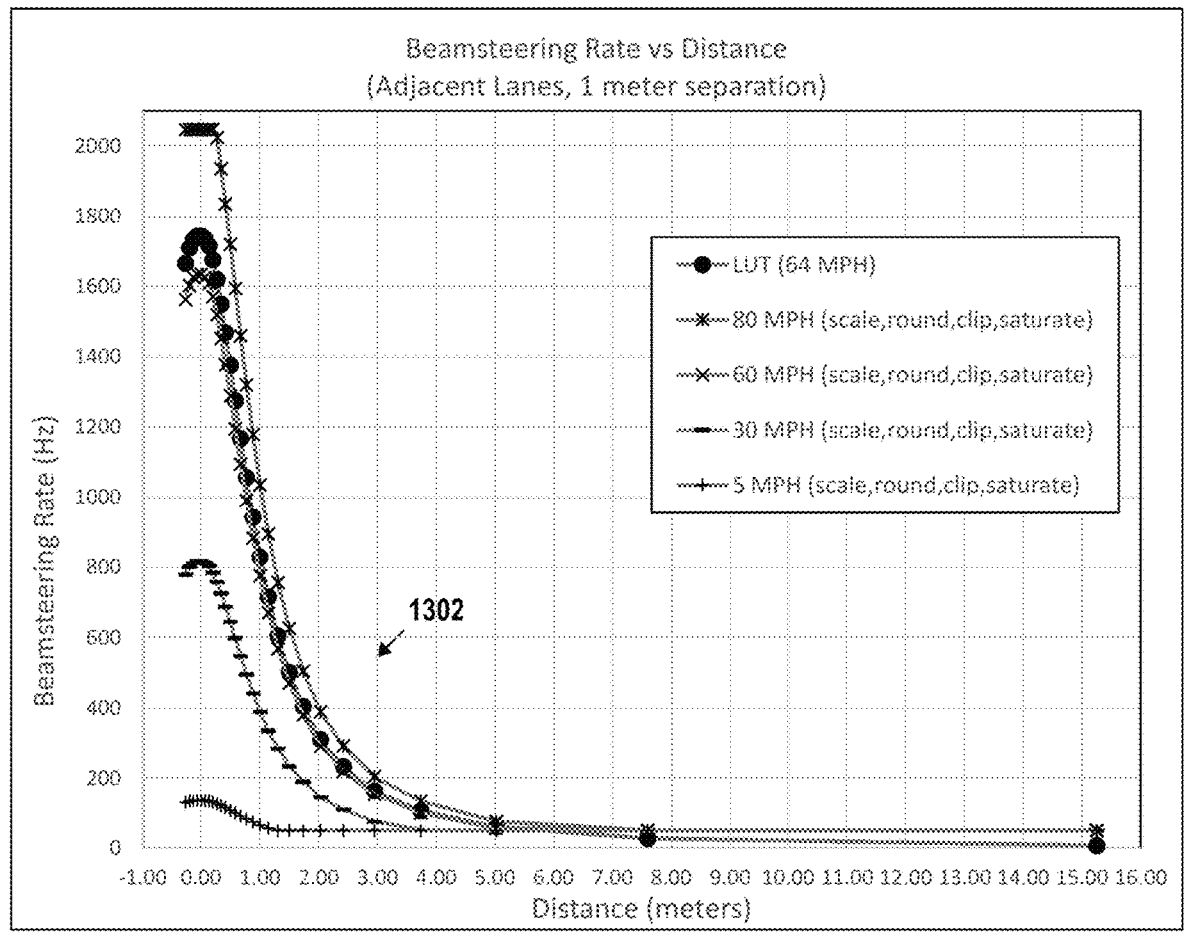

FIG. 13 depicts a diagram 1300 of an example of graphs of beam steering rate versus distance, in accordance with some example embodiments. FIG. 13 shows an example approach for setting a beam steering rate. In some examples, for a reduced separation, the beam steering rate may be increased for a given relative velocity. The beam steering rate curves 1302 may be estimated for an antenna 104*a* or 106*a*, of FIG. 7, for a radio separation of 1 meter, for example, 0.7 meters between the vehicles 102*a* and 102*b*. Based on a resulting curve for a 64 MPH absolute relative velocity, a look-up-table (LUT) may be generated where each of the thirty-two antenna configurations may be used to reference an estimate of the beam steering rate. The beam steering rate curves 1302 are based on the results from the kinematic model, wherein an antenna configuration (e.g., steering angle) may be used for estimating a range. The beam steering rate curves 1302 are based on the results for 64 MPH (based on the relative velocity to generate the LUT), 80 MPH, 60 MPH, 30 MPH, and 5 MPH.

Referring again to FIG. 7, the distance may be estimated based on a scenario when the antennas 104*a* and 106*a* may be separated by 1 meter and the antennas are properly bore sighted. The separation of the antennas 104*a* and 106*a* and the location of the antennas on each vehicle may vary. If the antennas 104*a* and 106*a* are separated by more than 1 meter (either due to lane separations or antenna location), then the steering rate requirement may be lower than that shown by the rate curves 1302 of FIG. 13.

The beam steering rate may be linear with respect to the absolute value of the relative velocity in the direction of travel. The rates associated with the rate curves 1302 may be defined by the LUT with the output of the LUT scaled by the absolute value of the relative velocity in the direction of travel. This approach may generate a family of rate curves required to provide a more optimal set of velocity-dependent beam refinement rates. The rate curves 1320 include resulting rates when the LUT outputs are scaled by the relative velocity in the direction of travel for speeds of 80 MPH, 60 MPH, 30 MPH, and 5 MPH. In some examples, the rate curves 1302 may be defined for a given communication link geometry. The communication link geometry may be fixed for a given profile, for example, the geometry may be set to a worst case scenario designed to provide beam refinement rates. The refinement rates may be higher than the refinement rates under nominal link geometry conditions. In some examples, a system 200 may dynamically switch between multiple look-up-tables. In the example embodiment of FIG. 13, a single LUT is utilized and for a single communication link geometry with a radio separation of one meter.

Figure 14:
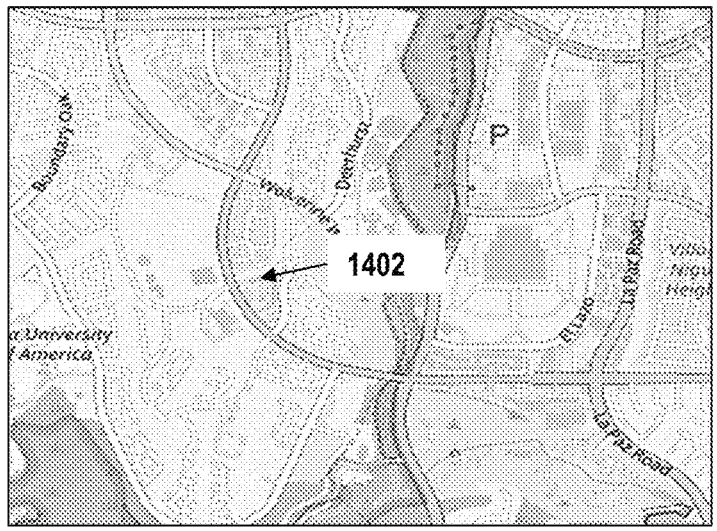
FIG. 14 depicts examples of road maps for a vehicle changing a direction of travel, in accordance with some example embodiments.
Figure 14:
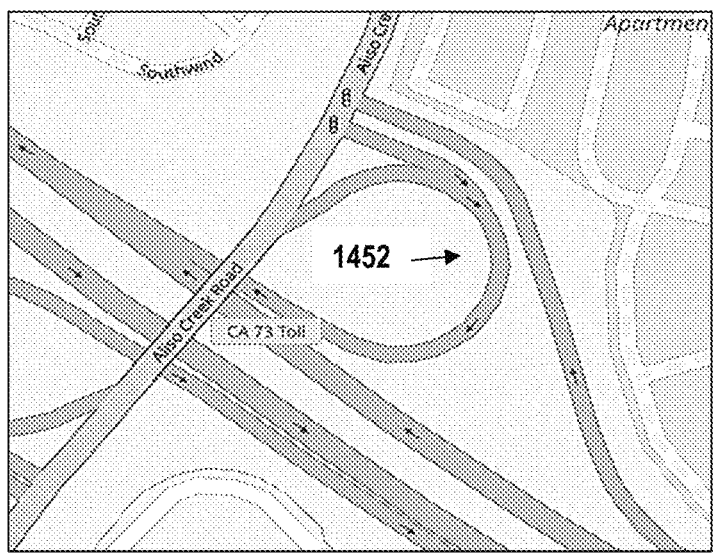

The radio link coordination may be accomplished via an omni-directional DSRC radio. A DSRC radio may utilize knowledge of distance, location, and lanes to improve the efficiency of the coordination of the beam formed by the radios. Beam steering across lanes or through angles may support bends in the roadway without handing off an established radio link to an adjacent radio. FIG. 14 shows two scenarios including a long bend in a highway and a sharp bend as with a highway entrance loop.

FIG. 14 depicts diagrams 1400 and 1450 of examples of road maps for a vehicle changing a direction of travel, in accordance with some example embodiments. Diagram 1400 illustrates a road map of a long bend in a highway 1402 where the steering angles at 100 meters and 50 meters between two peer vehicles may be at 3.5 degrees and 1.7 degrees, respectively Diagram 1450 illustrates a road map where there is a sharp bend in a freeway entrance loop 1452. For example, at the freeway entrance loop 1452, the steering angles for 20 meters and 10 meters between two peer vehicles may be at 17.4 degrees and 8.7 degrees, respectively. Each of the identified examples is well within the steering range and rates of the antennas at each vehicle.

In the examples of diagrams 1400 and 1450, the relative velocity in the direction of travel may be referenced except when the relative velocity perpendicular to the direction of travel may bias the specific antenna configurations evaluated during a specific beam refinement. Relative velocity perpendicular to the direction of travel may affect the results of the analysis herein. However, for a relative velocity perpendicular to the direction of travel of 3.7 meters per second (e.g., a full lane change in one second) and a minimum beam refinement rate of 50 Hz, a vehicle may have only moved 0.074 meters in either direction. Therefore, a relatively high minimum rate may minimize the effects.

Figure 15:
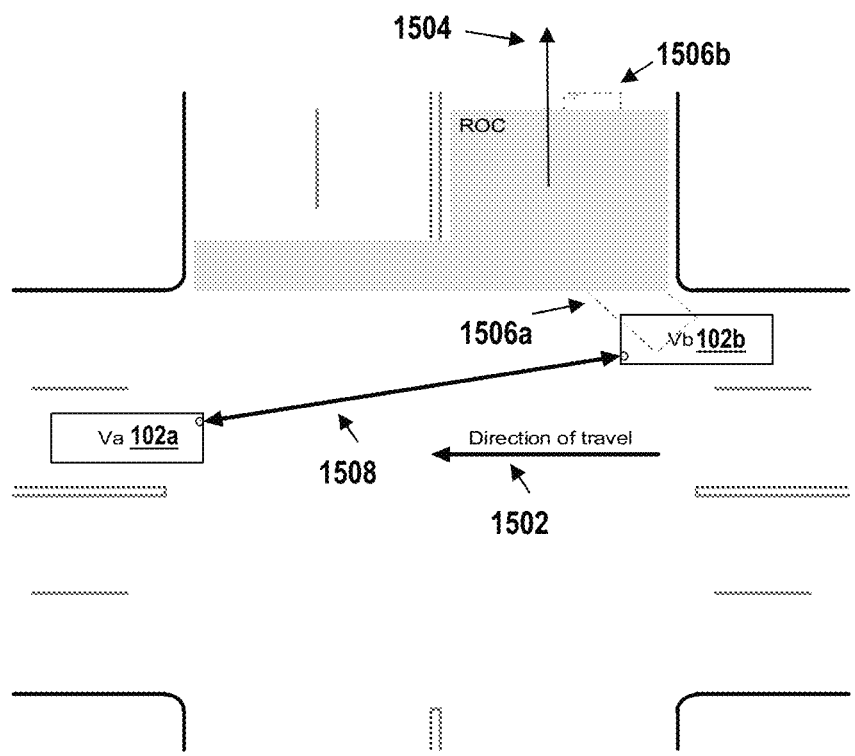
FIG. 15 and FIG. 16 depict additional examples of roadmaps and vehicle-to-vehicle communications, in accordance with some example embodiments.

FIG. 15 depicts a diagram 1500 of additional examples of roadmaps and vehicle-to-vehicle communications, in accordance with some example embodiments. In diagram 1500, vehicles Va 102a and Vb 102b are traveling in the same direction of travel 1502 when vehicle 102b changes its travel direction to a travel direction 1504 such that the position of vehicle 102b changes through positions 1506a and 1506b. In this scenario, when the trailing vehicle 102b turns, maintaining the link 1508 through the full turn may require communicating sensor information about the region of concern (ROC) before the vehicle 102b begins the turn.

Figure 16:
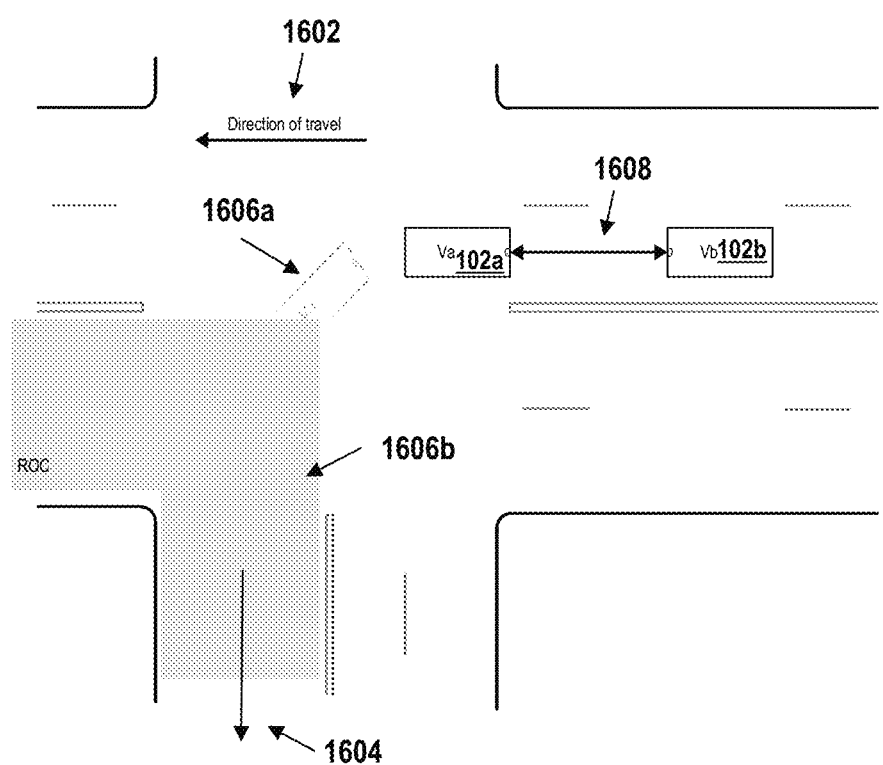

FIG. 16 depicts a diagram 1600 of additional examples of roadmaps and vehicle-to-vehicle communications, in accordance with some example embodiments. In diagram 1600, vehicles Va 102a and Vb 102b are traveling in the same direction of travel 1602 when vehicle 102a changes its travel direction into a travel direction 1604. The position of vehicle 102a changes through positions 1606a and 1606b. In this scenario, the steering angles of approximately plus or minus 45 degrees may be adequate to maintain a line of sight path to the trailing vehicle 102b. Because vehicles usually negotiate turns at slower speeds, the range of beam steering update rates discussed above may be sufficient to maintain the link 1608 through the line of sight portion of the turn before the vehicles 102a and 102b are at such distance and angular positions that the link 1608 might be lost.

In one scenario, the configuration of an antenna beam pattern between the vehicles 102a and 102b may be based on beam refinement protocol antenna configurations with larger beam angle steps, for example, 15 degrees, thereby evaluating fewer configurations. The process may be repeated and the results may be used to generate a more optimal configuration update. As discussed, the search results may be filtered, averaged, or a criteria or threshold may be applied to improve the results.

Figure 17:
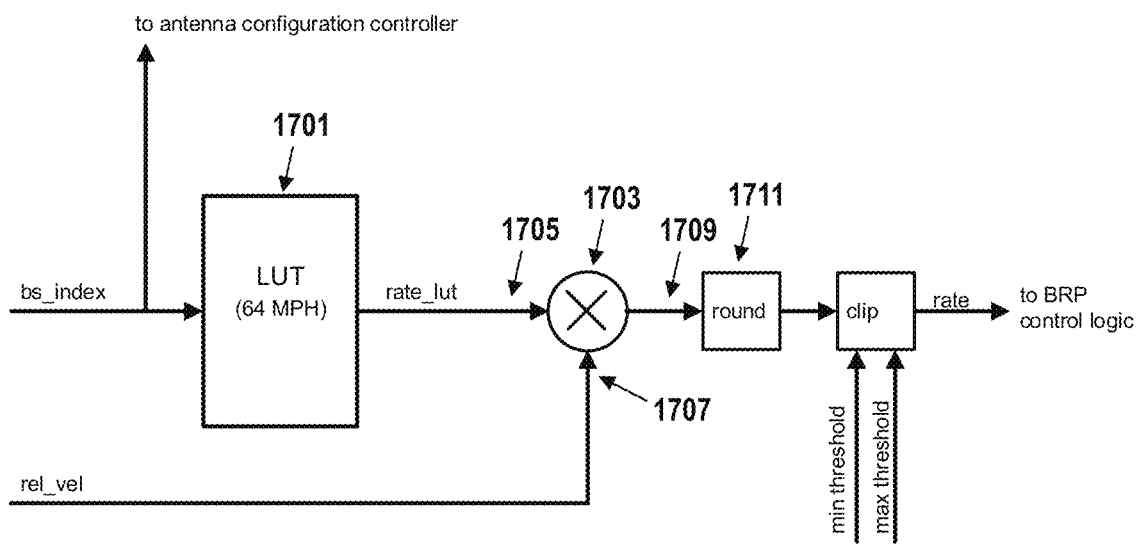
FIG. 17 depicts an example of a block diagram of a system for calculating beam steering rates, in accordance with some example embodiments.

FIG. 17 depicts an example of a block diagram of system 1700 for calculating beam steering rates, in accordance with some example embodiments.

Table 2 below includes example scaled and rounded values based on inputs of relative velocities at 80 MPH and 30 MPH.

TABLE 2

| LUT Index | Profile antenna angle | Est. Range | LUT (64 MPH) | 80 MPH (scale, round) | 80 MPH (clip) | 30 MPH (scale, round) | 30 MPH (clip) |
|---|---|---|---|---|---|---|---|
| 0 | −56.25 | 5.0 | 60 | 75 | 75 | 28 | 50 |
| 1 | −52.5 | 7.6 | 27 | 34 | 50 | 13 | 50 |
| 2 | −48.75 | 15.3 | 7 | 9 | 50 | 3 | 50 |
| 3 | −45 | 15.3 | 7 | 9 | 50 | 3 | 50 |
| 4 | −41.25 | 15.3 | 7 | 9 | 50 | 3 | 50 |
| 5 | −37.5 | 7.6 | 27 | 34 | 50 | 13 | 50 |
| 6 | −33.75 | 5.0 | 60 | 75 | 75 | 28 | 50 |
| 7 | −30 | 3.7 | 106 | 133 | 133 | 50 | 50 |
| 8 | −26.25 | 3.0 | 163 | 204 | 204 | 76 | 76 |
| 9 | −22.5 | 2.4 | 233 | 291 | 291 | 109 | 109 |
| 10 | −18.75 | 2.0 | 310 | 388 | 388 | 145 | 145 |
| 11 | −15 | 1.7 | 404 | 505 | 505 | 189 | 189 |
| 12 | −11.25 | 1.5 | 501 | 626 | 626 | 235 | 235 |
| 13 | −7.5 | 1.3 | 605 | 756 | 756 | 284 | 284 |
| 14 | −3.75 | 1.1 | 715 | 894 | 894 | 335 | 335 |
| 15 | 0 | 1.0 | 828 | 1035 | 1035 | 388 | 388 |
| 16 | 3.75 | 0.88 | 942 | 1178 | 1178 | 442 | 442 |
| 17 | 7.5 | 0.77 | 1056 | 1320 | 1320 | 495 | 495 |
| 18 | 11.25 | 0.67 | 1167 | 1459 | 1459 | 547 | 547 |
| 19 | 15 | 0.58 | 1275 | 1594 | 1594 | 598 | 598 |
| 20 | 18.75 | 0.49 | 1375 | 1719 | 1719 | 645 | 645 |
| 21 | 22.5 | 0.41 | 1468 | 1835 | 1835 | 688 | 688 |
| 22 | 26.25 | 0.34 | 1549 | 1936 | 1936 | 726 | 726 |
| 23 | 30 | 0.27 | 1619 | 2024 | 2024 | 759 | 759 |
| 24 | 33.75 | 0.20 | 1675 | 2094 | 2047 | 785 | 785 |
| 25 | 37.5 | 0.13 | 1715 | 2144 | 2047 | 804 | 804 |
| 26 | 41.25 | 0.07 | 1734 | 2168 | 2047 | 813 | 813 |
| 27 | 45 | 0.00 | 1743 | 2179 | 2047 | 817 | 817 |
| 28 | 48.75 | −0.07 | 1743 | 2179 | 2047 | 817 | 817 |
| 29 | 52.5 | −0.13 | 1732 | 2165 | 2047 | 812 | 812 |
| 30 | 56.25 | −0.20 | 1709 | 2136 | 2047 | 801 | 801 |
| 31 | 60 | −0.27 | 1665 | 2081 | 2047 | 780 | 780 |

A kinematic model may be derived for a specific profile and communication link geometry. In some examples, from the kinematic model, a beam refinement rate may be computed based on the system 1700 update rate criteria. For a given range of beam steering update rates and relative velocity, the beam refinement rate may be computed. In some embodiments, if the range is not known, then an estimated range may be determined based on an antenna configuration profile. For example, a beam steering rate versus distance may be estimated based on the kinematic model. A LUT 1701, such as table 2, may be generated, wherein for each antenna configuration within the specific profile, the kinematic model may be used to generate a previous estimate of rate for each antenna configuration. In some embodiments, for each antenna configuration, as illustrated in table 2, a LUT may be generated such that the input may be an antenna configuration index (e.g., 0-31 as shown in table 2) and the output may be a beam refinement rate. In some example embodiments, the beam refinement rate may be represented in units of Hertz; however, the beam refinement rate may be presented in any number format or units in accordance to a specific implementation. For example, an entry in a LUT may be an integer value for setting a preload or terminal count for a hardware counter, which may determine a period between beam refinement cycles. In some embodiments, the output of a LUT may be scaled by a current relative velocity. In some examples, the scaling may be a ratio between a current relative velocity and a relative velocity associated with the generation of a LUT entries, e.g., 64 MPH in the example embodiment of FIG. 17. In some examples, the scaling in the LUT may be based on a velocity calculated by raising the integer (e.g., number 2) to an applicable power. For the FIG. 17 example, in a binary, integer implementation at 1703, an output 1705 of the LUT 1701 may be multiplied by the current relative velocity 1707. Then, at 1703, the resultant may be right-shifted by six binary digits (e.g., $2^6=64$). The right-shifted result 1709 may be then rounded, at 1711, to a nearest integer value. It should be noted that many numerical formats exist and may be employed. In some embodiments, the system 1700 may utilize a minimum beam refinement update rate. The minimum beam refinement update rate may be determined, for example, by the system 1700, by providing a minimum threshold value (e.g., 50 Hz). In some embodiments, the system 1700 may limit a beam refinement maximum update rate, for example, limited to 2047 Hz.

According to some example embodiments, multiple vehicles may be able to communicate with each other by creating a multi access point, mesh network among parked vehicles (e.g., parking lots, neighborhoods, sports arenas, etc.). Multiple instrumented vehicles (e.g, in a parking lot) may form a mesh network via their respective antenna arrays. Further, some of the vehicles might be near access points (e.g., modems, routers, cell phones, etc.) with available wireless connections (e.g., IEEE 802.11, 4G, 5G, laser, etc.). Such access points may provide the mesh network with access to external networks (e.g., Internet, WAN, etc.). Such embodiments provide for creating ad hoc networks may be used for many different purposes including: software updates to one or more vehicles, providing access to emergency services, or Internet access via tailgate parties in a sports arena, just to name a few. Such a mesh network may include multiple access points. Nodes of the mesh network may distribute packets among the access points to improve performance (e.g. to improve bandwidth, improve quality of service, and/or decrease latency).

While this specification contains many specifics, these should not be construed as limitations on the scope of what may be claimed or of what may be claimed, but rather as descriptions of features specific to particular implementations or embodiments. Certain features that are described in this specification in the context of separate implementations may also be implemented in combination in a single implementation. Conversely, various features that are described in the context of a single implementation may also be implemented in multiple implementations or embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results. Only a few examples and implementations are disclosed. Variations, modifications and enhancements to the described examples and implementations and other implementations may be made based on what may be disclosed.

Figure 18:
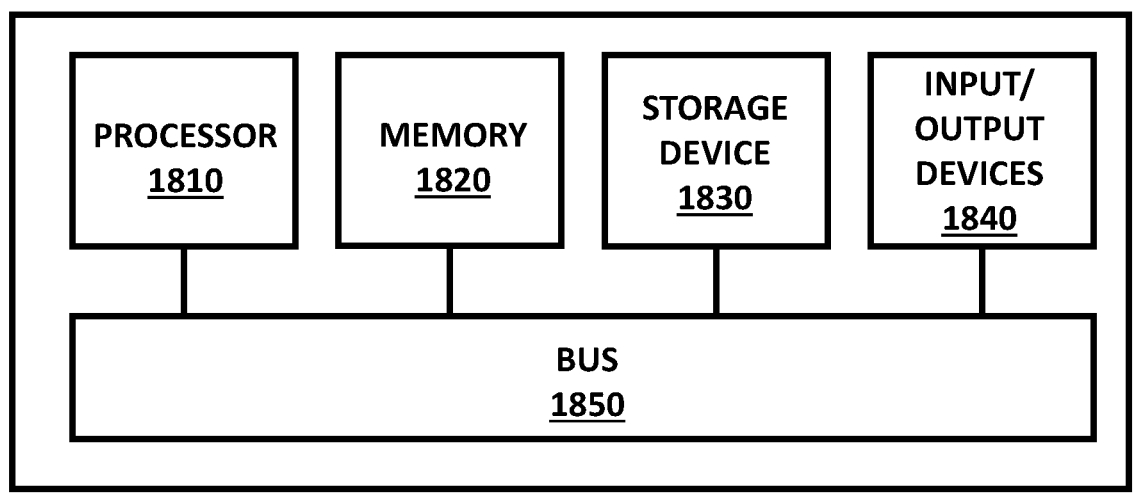
FIG. 18 depicts a block diagram illustrating a computing system consistent with some implementations of the current subject matter.

FIG. 18 depicts a block diagram illustrating a computing system 1800 consistent with some implementations of the current subject matter. The computing system 1800 can be used to implement the system 200, of FIG. 2A, including a host CPU system 204 and/or any components of the system 200. Moreover, system 1800 may be used to perform the operations described herein with respect to at least processes of FIGS. 1-6.

As shown in FIG. 18, the computing system 1800 can include a processor 1810, a memory 1820, a storage device 1830, and input/output devices 1840. The processor 1810, the memory 1820, the storage device 1830, and the input/output devices 1840 can be interconnected via a system bus 1850. The processor 1810 is capable of processing instructions for execution within the computing system 1800. Such executed instructions can implement one or more components of, for example, host or upper MAC functions associated with the transceivers 202a-202n. In some example embodiments, the processor 1810 can be a single-threaded processor. Alternately, the processor 1810 can be a multi-threaded processor. The processor 1810 is capable of processing instructions stored in the memory 1820 and/or on the storage device 1830 to display graphical information for a user interface provided via the input/output device 1840.

The memory 1820 is a computer readable medium such as volatile or non-volatile that stores information within the computing system 1800. The memory 1820 can store data structures representing configuration object databases, for example. The storage device 1830 is capable of providing persistent storage for the computing system 1800. The storage device 1830 can be a floppy disk device, a hard disk device, a solid state disk device, a flash drive device, an optical disk device, or a tape device, or other suitable persistent storage means. The input/output device 1840 provides input/output operations for the computing system 1800. In some example embodiments, the input/output device 1840 includes a keyboard and/or pointing device. In various implementations, the input/output device 1840 includes a display unit for displaying graphical user interfaces.

According to some example embodiments, the input/output device 1840 can provide input/output operations for a network device. For example, the input/output device 1840 can include Ethernet ports or other networking ports to communicate with one or more wired and/or wireless networks (e.g., a local area network (LAN), a wide area network (WAN), the Internet, etc.).

In some example embodiments, the computing system 1800 can be used to execute various interactive computer software applications that can be used for organization, analysis and/or storage of data in various formats. Alternatively, the computing system 1800 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1840. The user interface can be generated and presented to a user by the computing system 1800 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   selecting a first antenna coupled to a first transceiver at a first vehicle;
   determining a configuration of a first beam pattern emanated by the first antenna; and
   reconfiguring, based on the configuration of the first beam pattern and a beam tracking packet, the first antenna to provide a beam tracking of the first beam pattern,
   wherein the first beam pattern is associated with a wireless communication link to an object proximate to the first vehicle,
   wherein the object proximate to the first vehicle comprises at least one of a second vehicle and a stationary object,
   wherein reconfiguring the first antenna is further based on a steering angle associated with the first antenna and a distance between the first vehicle and the object proximate to the first vehicle,
   wherein reconfiguring the first antenna includes reconfiguring the first beam pattern emanated by the first antenna based on a target data rate for transmission via the wireless communication link associated with the first beam pattern; and
   wherein a rate of reconfiguring the first antenna is based on at least one of a location of the first antenna, the configuration of the first beam pattern, a velocity of the first vehicle relative to the object proximate to the first vehicle, and an orientation of the first antenna.

2. The method of claim 1, wherein the beam tracking packet comprises a packet received via the wireless communication link.

3. The method of claim 1, wherein reconfiguring the first antenna comprises a modification of the first beam pattern, and wherein the modification of the first beam pattern comprises establishing the wireless communication link with a first beamwidth, and reducing the beamwidth to a second beamwidth which is narrower than the first beamwidth during a beam alignment.

4. The method of claim 1, wherein reconfiguring the first antenna further comprises
   determining, based on a field of operation of the first antenna, an amplitude and a phase for reconfiguring the first antenna; and
   applying the amplitude and the phase to the first antenna.

5. The method of claim 1, wherein determining the configuration of the first beam pattern is based on configuration information associated with the first antenna.

6. The method of claim 1, wherein determining the configuration of the first beam pattern is based on configuration information associated with a second antenna proximate to the first antenna.

7. The method of claim 1, wherein the reconfiguring is further based on link metrics of the wireless communication link.

8. The method of claim 1, wherein the first vehicle comprises an emergency vehicle, and wherein the method further comprises:
   selecting a second antenna coupled to a second transceiver at the first vehicle;
   determining a configuration for a second beam pattern emanated by the second antenna; and
   broadcasting, via the second beam pattern emanated by the second antenna, a message indicating the first vehicle requires a right of way through traffic.

9. The method of claim 1, wherein the first vehicle comprises a plurality of antennas including the first antenna, and wherein each of the plurality of antennas is coupled to a respective transceiver of a plurality of transceivers at the first vehicle.

10. An apparatus comprising:
    at least one processor; and
    at least one memory including computer program code, the at least one memory and the computer program code configured to, with the at least one processor, cause the apparatus to at least:
        select a first antenna coupled to a first transceiver at a first vehicle;
        determine a configuration of a first beam pattern emanated by the first antenna; and
        reconfigure, based on the configuration of the first beam pattern and a beam tracking packet, the first antenna to provide a beam tracking of the first beam pattern,
        wherein the first beam pattern is associated with a wireless communication link to an object proximate to the first vehicle,
        wherein the object proximate to the first vehicle comprises at least one of a second vehicle and a stationary object,
        wherein the reconfiguration of the first antenna is further based on a steering angle associated with the first antenna and a distance between the first vehicle and the object proximate to the first vehicle, and
        wherein a rate of reconfiguration of the first antenna is based on at least a velocity of the first vehicle relative to the object proximate to the first vehicle, the rate of reconfiguration is set at a first rate in response to determining a first relative velocity between the first vehicle and the object, the rate of reconfiguration is set at a second rate in response to determining a second relative velocity between the first vehicle and the object, the second relative velocity is greater than the first relative velocity, and the second rate is greater than the first rate.

11. The apparatus of claim 10, wherein the beam tracking packet comprises a packet received via the wireless communication link.

12. The apparatus of claim 10, wherein the reconfiguration of the first antenna comprises a modification of the first beam pattern, and wherein the modification of the first beam pattern comprises at least one of a modification of a beamwidth of the first beam pattern and a modification of a range of the first beam pattern.

13. The apparatus of claim 10, wherein to reconfigure the first antenna, the apparatus is further caused to at least:
    determine, based on a field of operation of the first antenna, an amplitude and a phase for the reconfiguration of the first antenna; and
    apply the amplitude and the phase to the first antenna.

14. The apparatus of claim 10, wherein the determination of the configuration of the first beam pattern is based on configuration information associated with the first antenna.

15. The apparatus of claim 10, wherein determining the configuration of the first beam pattern is based on configuration information associated with a second antenna proximate to the first antenna.

16. The apparatus of claim 10, wherein the reconfiguration of the first antenna is further based on link metrics of the wireless communication link.

17. The apparatus of claim 10, wherein the first vehicle comprises an emergency vehicle, and wherein the apparatus is further configured to at least:
    select a second antenna coupled to a second transceiver at the first vehicle;
    determine a configuration for a second beam pattern emanated by the second antenna; and
    broadcast, via the second beam pattern emanated by the second antenna, a message indicating the first vehicle requires a right of way through traffic.

18. The apparatus of claim 10, wherein the first vehicle comprises a plurality of antennas including the first antenna, and wherein each of the plurality of antennas is coupled to a respective transceiver of a plurality of transceivers at the first vehicle.

19. A non-transitory computer-readable storage medium including program code that when executed by at least one processor causes operations comprising:
    selecting a first antenna coupled to a first transceiver at an emergency vehicle;
    selecting a second antenna coupled to a second transceiver at the emergency vehicle;
    determining a configuration of a first beam pattern emanated by the first antenna;
    determining a configuration of a second beam pattern emanated by the second antenna;
    broadcasting, via the second beam pattern emanated by the second antenna, a message indicating the first vehicle requires a right of way through traffic; and
    reconfiguring, based on the configuration of the first beam pattern and a beam tracking packet, the first antenna to provide a beam tracking of the first beam pattern,
    wherein the first beam pattern is associated with a wireless communication link to an object proximate to the emergency vehicle,
    wherein the object proximate to the emergency vehicle comprises at least one of a second vehicle and a stationary object, wherein reconfiguring the first antenna is further based on a steering angle associated with the first antenna and a distance between the emergency vehicle and the object proximate to the emergency vehicle, wherein a rate of reconfiguring the first antenna is based on at least one of a location of the first antenna, the configuration of the first beam pattern, a velocity of the emergency vehicle relative to the object proximate to the emergency vehicle, and an orientation of the first antenna.

20. The non-transitory computer-readable storage medium of claim 19, wherein the determining the configuration of the first beam pattern is based on at least one of configuration information associated with the first antenna and configuration information associated with the second antenna proximate to the first antenna.

* * * * *